United States Patent
Myhre et al.

(10) Patent No.: US 11,310,868 B2
(45) Date of Patent: Apr. 19, 2022

(54) APPLICATION TOPOLOGY AWARE USER PLANE SELECTION IN NR AND 5GC

(71) Applicant: Telefonaktiebolaget LM Ericsson (publ), Stockholm (SE)

(72) Inventors: Elena Myhre, Järfälla (SE); Göran Hall, Mölndal (SE); Jan Backman, Kärna (SE); Jari Vikberg, Järna (SE); Mattias Wahlqvist, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 15/761,276

(22) PCT Filed: Feb. 20, 2018

(86) PCT No.: PCT/EP2018/054101
§ 371 (c)(1),
(2) Date: Mar. 19, 2018

(87) PCT Pub. No.: WO2018/177656
PCT Pub. Date: Oct. 4, 2018

(65) Prior Publication Data
US 2019/0313479 A1     Oct. 10, 2019

Related U.S. Application Data

(60) Provisional application No. 62/479,910, filed on Mar. 31, 2017.

(51) Int. Cl.
*H04W 80/10* (2009.01)
*H04W 76/12* (2018.01)
(Continued)

(52) U.S. Cl.
CPC ......... *H04W 80/10* (2013.01); *H04L 41/5051* (2013.01); *H04L 67/1004* (2013.01);
(Continued)

(58) Field of Classification Search
CPC ..... H04W 80/10; H04W 80/08; H04W 80/12; H04W 76/12; H04W 76/11; H04W 76/10;
(Continued)

(56) References Cited

U.S. PATENT DOCUMENTS 7,162,467 B2   1/2007  Eshleman et al.
8,072,900 B2  12/2011  Antal et al.
(Continued)

OTHER PUBLICATIONS

Non-Final Office Action for U.S. Appl. No. 15/762,128, dated Apr. 24, 2019, 16 pages.
(Continued)

*Primary Examiner* — Jeffrey M Rutkowski
*Assistant Examiner* — Sudesh M Patidar
(74) *Attorney, Agent, or Firm* — Withrow & Terranova, PLLC

(57) ABSTRACT

Systems and methods relating to selection of user plane functions in a core network and a radio access network of a cellular communications network that take into consideration information related to application server selection are disclosed. In some embodiments, a method of operation of a network node in a cellular communications network that comprises a radio access network and a core network comprises selecting a user plane function for a protocol data unit session for a wireless device based on information related to application server selection such that the protocol data unit session for the wireless device utilizes the selected user plane function. In this manner, optimal user plane connectivity between an application client in the wireless device and an application server is provided.

22 Claims, 18 Drawing Sheets

(51) Int. Cl.

| | |
|---|---|
| *H04W 76/11* | (2018.01) |
| *H04W 8/08* | (2009.01) |
| *H04W 80/12* | (2009.01) |
| *H04L 41/5051* | (2022.01) |
| *H04L 67/1004* | (2022.01) |
| *H04L 41/50* | (2022.01) |
| *H04L 41/12* | (2022.01) |

(52) U.S. Cl.
CPC .............. *H04W 8/08* (2013.01); *H04W 76/11* (2018.02); *H04W 76/12* (2018.02); *H04W 80/12* (2013.01); *H04L 41/12* (2013.01); *H04L 41/5087* (2013.01)

(58) Field of Classification Search
CPC . H04W 84/00; H04W 12/0013; H04W 76/16; H04W 72/0486; H04W 28/16; H04W 28/0247; H04W 28/08; H04W 28/0831; H04W 28/0835; H04W 28/0842; H04W 28/26; H04W 8/08; H04W 8/065; H04W 8/06; H04L 41/5087; H04L 41/12; H04L 41/5051; H04L 67/1004; H04L 67/14; H04L 67/1014; H04L 67/1017; H04L 67/1019; H04L 67/1023; H04L 67/1021; H04L 67/1036; H04L 67/141; H04L 65/1006; H04L 65/1069
USPC ......................................................... 370/329
See application file for complete search history.

(56) References Cited

U.S. PATENT DOCUMENTS

| | | | |
|---|---|---|---|
| 8,447,304 B2 | 5/2013 | Morinaga et al. | |
| 9,344,949 B2 | 5/2016 | Mufti | |
| 2008/0043666 A1 | 2/2008 | Tamura et al. | |
| 2009/0019180 A1* | 1/2009 | Aso | H04L 61/6077 709/238 |
| 2010/0004014 A1* | 1/2010 | Coulombe | H04L 65/104 455/519 |
| 2012/0113809 A1* | 5/2012 | Cortes Gomez | H04L 12/5691 370/235 |
| 2012/0324083 A1* | 12/2012 | Lee | H04L 67/1002 709/223 |
| 2014/0280813 A1* | 9/2014 | Ramachandran | H04L 69/22 709/223 |
| 2014/0341085 A1* | 11/2014 | Suryavanshi | H04L 67/1021 370/260 |
| 2016/0338039 A1* | 11/2016 | Van Der Velde | H04L 5/0053 |
| 2017/0078153 A1 | 3/2017 | Zhang et al. | |
| 2017/0085628 A1* | 3/2017 | Mahindra | H04L 67/10 |
| 2017/0086049 A1* | 3/2017 | Vrzic | H04W 4/046 |
| 2017/0142206 A1* | 5/2017 | Kodaypak | H04L 67/10 |
| 2018/0035351 A1* | 2/2018 | Kodaypak | H04L 1/22 |
| 2018/0041436 A1* | 2/2018 | Zhang | H04W 76/11 |
| 2018/0220339 A1* | 8/2018 | Arora | H04W 36/0022 |
| 2018/0294994 A1* | 10/2018 | Yin | H04L 12/4633 |
| 2018/0310350 A1* | 10/2018 | Stojanovski | H04L 61/1511 |
| 2019/0075606 A1 | 3/2019 | Myhre et al. | |
| 2019/0090164 A1* | 3/2019 | Ding | H04W 76/11 |
| 2019/0182895 A1* | 6/2019 | Di Girolamo | H04W 36/0033 |
| 2019/0191309 A1* | 6/2019 | Kweon | H04W 80/10 |
| 2020/0187108 A1* | 6/2020 | Pragada | H04W 76/14 |

OTHER PUBLICATIONS

Author Unknown, "Technical Specification Group Core Network and Terminals; SIP-I based circuit-switched core network; Stage 2 (Release 14)," Technical Specification 23.231, Version 14.0.0, 3GPP Organizational Partners, Mar. 2017, 73 pages.

Author Unknown, "Technical Specification Group Services and System Aspects; System Architecture for the 5G System; Stage 2 (Release 15)," Technical Specification 23.501, Version 0.3.1, 3GPP Organizational Partners, Mar. 2017, 97 pages.

Westerberg, Erik, "4G/5G Architecture: How a Split Can Make the Difference," Ericsson Technology Review, vol. 93, Jul. 22, 2016, 16 pages.

International Search Report and Written Opinion for International Patent Application No. PCT/EP2018/053135, dated Jun. 7, 2018, 19 pages.

International Search Report and Written Opinion for International Patent Application No. PCT/EP2018/054101, dated May 15, 2018, 17 pages.

Non-Final Office Action for U.S. Appl. No. 15/762,128, dated Aug. 15, 2019, 19 pages.

Final Office Action for U.S. Appl. No. 15/762,128, dated Dec. 5, 2019, 21 pages.

Non-Final Office Action for U.S. Appl. No. 15/762,128, dated Mar. 18, 2020, 27 pages.

Notification of Reason for Refusal for Korean Patent Application No. 10-2019-7028687, dated Jul. 10, 2020, 13 pages.

Examination Report for European Patent Application No. 18706998. 4, dated Aug. 5, 2020, 3 pages.

Final Office Action for U.S. Appl. No. 15/762,128, dated Jul. 22, 2020, 28 pages.

Examination Report for European Patent Application No. 18705580. 1, dated Sep. 21, 2021, 6 pages.

\* cited by examiner

Uncoordinated selection of UPF, PPF and application server

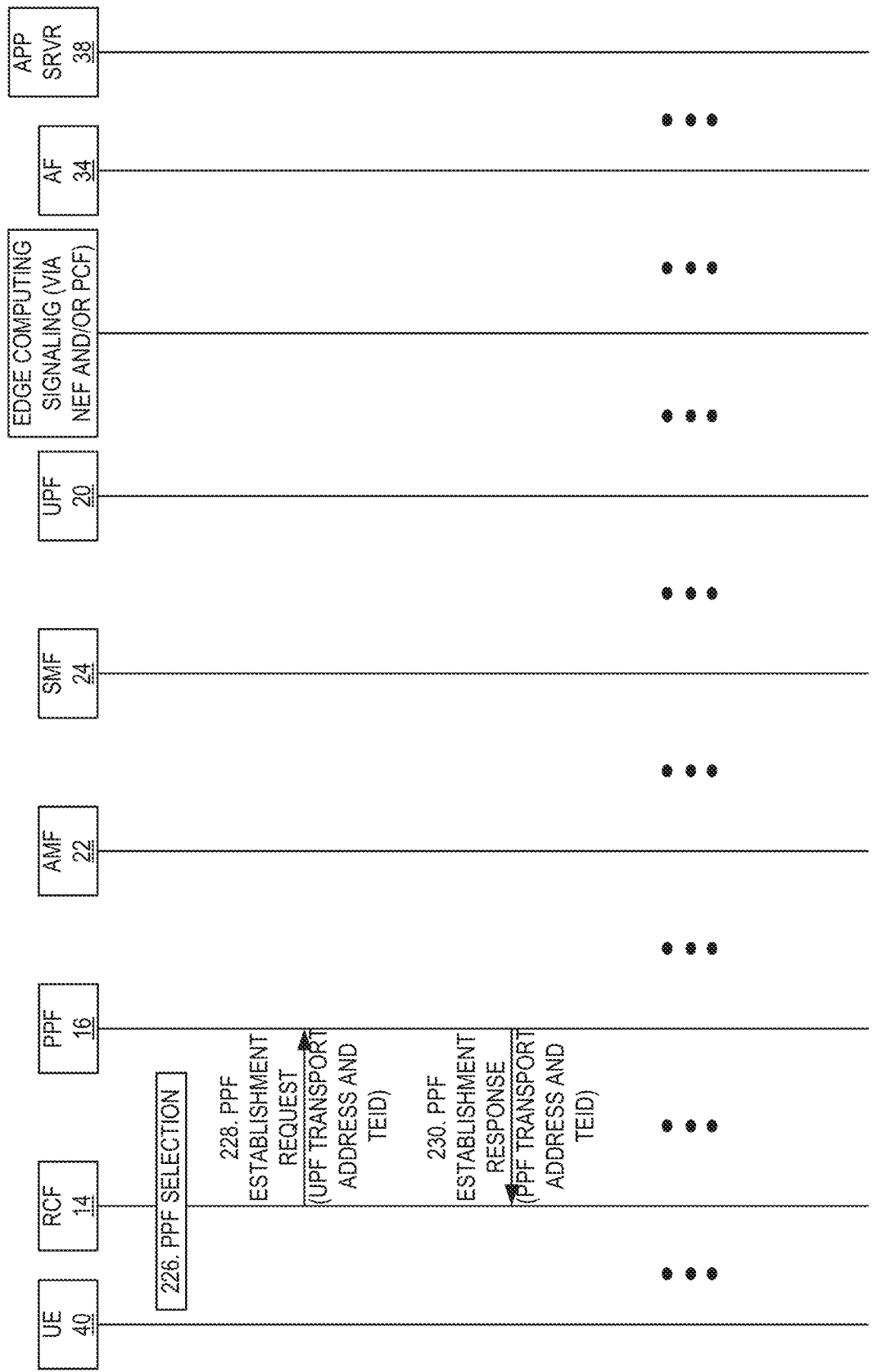

US 11,310,868 B2

APPLICATION TOPOLOGY AWARE USER PLANE SELECTION IN NR AND 5GC

RELATED APPLICATIONS

This application is a 35 U.S.C. § 371 national phase filing of International Application No. PCT/EP2018/054101, filed Feb. 20, 2018, which claims the benefit of provisional patent application Ser. No. 62/479,910, filed Mar. 31, 2017, the disclosures of which are hereby incorporated herein by reference in its entirety their entireties.

TECHNICAL FIELD

The present disclosure relates to selection of User Plane (UP) functions in a core network and a Radio Access Network (RAN) of a cellular communications network as well as selection of an Application Server (AS).

BACKGROUND

In current Long Term Evolution (LTE) networks, the Mobility Management Entity (MME) selects which Serving Gateway (S-GW)/Packet Data Network (PDN) Gateway (P-GW) should be used by a specific User Equipment device (UE). In an LTE Radio Access Network (RAN), no such selection is done, as the User Plane (UP) processing is integrated in the enhanced or evolved Node B (eNB) handling the Control Plane (CP) termination for the UE.

Fifth Generation (5G) systems are being currently specified by Third Generation Partnership Project (3DPP), and in this context the 5G Core Network (5GC) is comprised of several functions, among which is the UP Function (UPF). In a similar way, the Next Generation RAN (NG-RAN) contains a Packet Processing Function (PPF), which may or may not be represented by a new logical function in 3DPP. If such PPF is not standardized as a separate logical function, it must be part of a New Radio (NR) Base Station (gNB)/eNB/Central Unit (CU) (containing both PPF and Radio Control Function (RCF)), otherwise it would be likely explicitly defined, and a 3DPP-defined interface would likely connect it to the RCF.

Thus, for 5G, the situation gets more complicated:
  The Session Management Function (SMF) in the 5GC can select one or several UPFs. Note that the 5GC is also referred to herein as a Next Generation (NG) Core Network (NGC or NG-CN).
  The function handling the CP termination (e.g., RCF) in the 5G RAN might select one or several UP handling functions (e.g., PPFs). The 5G RAN is also referred to herein as a NG-RAN.
  For each Protocol Data Unit (PDU) session, a pair of UPF and PPF functions is selected as there is a single tunnel between these functions.
  There are two separate discussions about deployment of functionality as following:
    a) distribution of Core Network (CN) UPF functionality further out in the network, and
    b) centralization of RAN functionality, both RCF and PPF, higher up in the network.

The above assumes a RAN implementation where the function handling the CP and the one handling the packet processing (i.e., UP) are logically distinct to enable flexibility and improved scalability. If the CP and UP in RAN are not logically separate, it is assumed there is no selection to be made (note that 'logically separate' still applies even if the PPF and RCF are co-sited, as in principle one RCF could select a PPF that is not the one(s) it is co-sited with).

5G results in many new technical problems that need to be solved, one of which is UPF and PPF selection. As such, there is a need for systems and methods for UPF and PPF selection, particularly in a 5G network.

SUMMARY

Systems and methods relating to selection of user plane functions in a Core Network (CN) and a Radio Access Network (RAN) of a cellular communications network that take into consideration information related to Application Server (AS) selection are disclosed. In some embodiments, a method of operation of a network node in a cellular communications network that comprises a RAN and a CN comprises selecting a user plane function for a Protocol Data Unit (PDU) session for a wireless device based on information related to AS selection such that the PDU session for the wireless device utilizes the selected user plane function. In this manner, optimal user plane connectivity between an application client in the wireless device and an AS is provided.

In some embodiments, the network node is a Session Management Function (SMF), the SMF being in the CN.

In some embodiments, the information related to AS selection comprises information that indicates an AS selected for the wireless device. In some embodiments, the information related to AS selection comprises information that indicates at least one User Plane Function (UPF) pool related to a selected AS, wherein each of the at least one UPF pool comprises one or more UPFs where a UPF is a user plane function in the CN. In some embodiments, the information related to AS selection comprises information that indicates at least one Packet Processing Function (PPF) pool related to a selected AS, wherein each of the at least one PPF pool comprises one or more PPFs where a PPF is a user plane function in the RAN. In some embodiments, the information related to AS selection comprises a list of one or more candidate AS locations. In some embodiments, the information related to AS selection comprises one or more assumptions regarding locations of one or more candidate ASs.

In some embodiments, the method further comprises receiving, from another network node, a message comprising a list of candidate PPF pools for the PDU session for the wireless device, each candidate PPF pool in the list of candidate PPF pools comprising one or more PPFs wherein a PPF is a user plane function in the RAN; selecting a list of candidate UPF pools for the PDU session for the wireless device, each candidate UPF pool in the list of candidate UPF pools comprising one or more UPFs wherein a UPF is a user plane function in the CN; providing, to an Application Function (AF), information comprising: (a) the list of candidate PPF pools and the list of candidate UPF pools or (b) combined information obtained by combining the list of candidate PPF pools and the list of candidate UPF pools; and receiving, from the AF, AS related information comprising: (a) information that indicates an AS selected for the wireless device and/or (b) information that indicates at least one UPF pool from the list of candidate UPF pools and/or (c) information that indicates at least one PPF pool from the list of candidate PPF pools. Further, selecting the user plane function comprises selecting a UPF for the PDU session for the wireless device based on the AS related information, and the method further comprises sending a message comprising an indication of the selected UPF to another network node. In some embodiments, the indication of the selected UPF comprises an indication of a UPF pool of the selected UPF and/or an indication of the selected UPF. In some embodiments, the indication of the selected UPF comprises a transport address and Tunnel Endpoint Identifier (TEID) of the selected UPF.

In some embodiments, the method further comprises obtaining, from an AF, a list of candidate AS locations. Further, selecting the user plane function comprises selecting a UPF for the PDU session for the wireless device based on the list of candidate AS locations, the UPF being a user plane function in the CN. The method further comprises providing, to another network node, a message comprising an indication of the selected UPF.

In some embodiments, the method further comprises obtaining, from an AF, a list of candidate AS locations; providing, to another network node, a message comprising the list of candidate AS locations; and receiving, from another network node, a message comprising an indication of a PPF selected for the PDU session for the wireless device, the PPF being a user plane function in the RAN. Further, selecting the user plane function comprises selecting a UPF for the PDU session for the wireless device based on the PPF selected for the PDU session for the wireless device, the UPF being a user plane function in the CN.

In some embodiments, the network node is a Radio Control Function (RCF), the RCF being in the RAN.

In some embodiments, the method further comprises obtaining, from another network node, a list of candidate AS locations. Further, selecting the user plane function for the PDU session comprises selecting a PPF for the PDU session for the wireless device based on the list of candidate AS locations, the PPF being a user plane function in the RAN. The method further comprises providing, to another network node, a message comprising an indication of the PPF selected for the PDU session for the wireless device.

In some embodiments, selecting the user plane function for the PDU session comprises selecting a PPF for the PDU session for the wireless device based on one or more assumptions related to one or more AS locations, the PPF being a user plane function in the RAN; and providing, to another network node, a message comprising an indication of the selected PPF.

Embodiments of a network node are also disclosed. In some embodiments, a network node for operation in a cellular communications network that comprises a RAN and a CN is adapted to select a user plane function for a PDU session for a wireless device based on information related to AS selection such that the PDU session for the wireless device utilizes the selected user plane function.

Embodiments of a physical network node are also disclosed. In some embodiments, a physical network node that hosts a network node in a cellular communications network that comprises a RAN and a CN is provided, wherein the network node is a logical network node and the physical network node comprises at least one processor and memory comprising instructions executable by the at least one processor whereby the physical network node is operable to implement the network node, the network node being operable to select a user plane function for a PDU session for a wireless device based on information related to AS selection such that the PDU session for the wireless device utilizes the selected user plane function.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
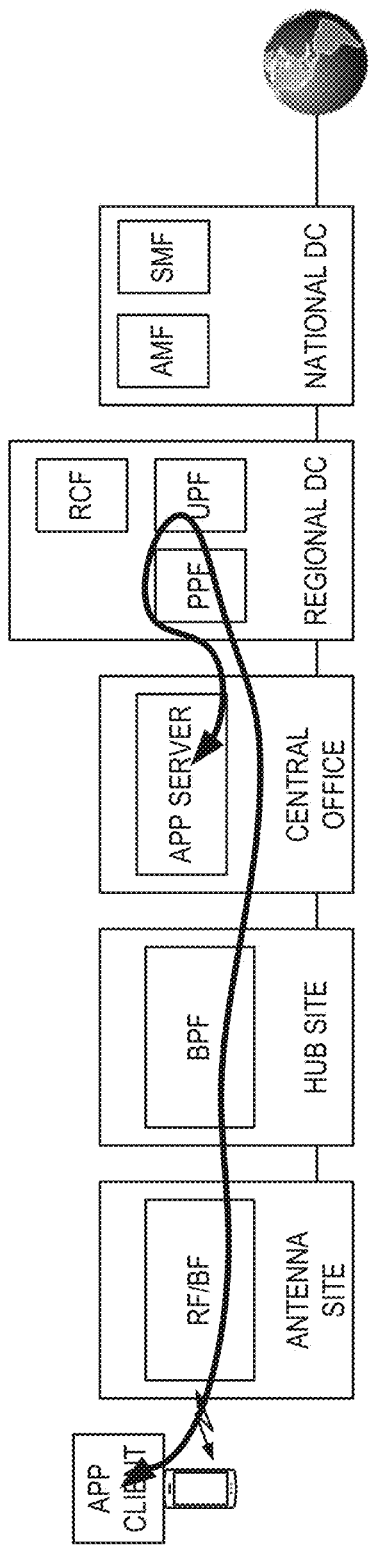
FIG. 1 illustrates uncoordinated selection of a User Plane (UP) Function (UPF), a Packet Processing Function (PPF), and an Application Server (AS)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3DPP) Next Generation (NG) RAN (NG-RAN) or an enhanced or evolved Node B (eNB) in a 3DPP Long Term Evolution (LTE) network), a high-power or macro base station, a low-power base station (e.g., a micro base station, a pico base station, a home eNB, or the like), and a relay node. A radio access node may also be other nodes in the RAN such as, for example, a Radio Control Function (RCF) or Packet Processing Function (PPF) in some implementations of a Fifth Generation (5G) RAN. Note that in 3DPP the logical node corresponding to the RCF is called CU-CP (Central Unit-Control Plane) and the logical node corresponding to the PPF is called CU-UP (Central Unit-User Plane).

Core Network (CN) Node: As used herein, a "CN node" is any type of node in a CN. Some examples of a CN node include, e.g., a Mobility Management Entity (MME), a Serving Gateway (S-GW), a Packet Data Network (PDN) Gateway (P-GW), a Service Capability Exposure Function (SCEF), a Session Management Function (SMF), a User Plane (UP) Function (UPF), an Access and Mobility Management Function (AMF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3DPP network and a Machine Type Communication (MTC) device.

Network Node: As used herein, a "network node" is any node that is either part of the RAN or the CN of a cellular communications network/system.

UPF Pool: As used herein, a "UPF pool" is a group of UPFs typically located at the same site (but they would not necessarily need to be depending on the topology of the network) and serving the same area (where area may be a logical or physical concept). The different UPFs belonging to a UPF pool can be seen as UPF pool members and may provide similar functionality. It is also typical to perform load balancing between UPF pool members.

UPF Pool Information: As used herein, "UPF pool information" is UPF pool identity, UPF pool name (Fully Qualified Domain Name (FQDN) like or similar), UPF Pool address, UPF Pool location, and/or the like.

UPF Information: As used herein, "UPF information" is any information that directly or indirectly indicates a location of a UPF such as, for example, UPF name (FQDN like or similar), UPF address, UPF location, and/or the like.

PPF Pool: As used herein, a "PPF pool" is a group of PPFs typically located at the same site (but they would not necessarily need to be depending on the topology of the network) and serving the same area (where area may be a logical or physical concept). The different PPFs belonging to a PPF pool can be seen as PPF pool members and may provide similar functionality. It is also typical to perform load balancing between PPF pool members.

PPF Pool Information: As used herein, "PPF pool information" is PPF pool identity, PPF pool name (FQDN like or similar), PPF Pool address, PPF Pool location, and/or the like.

PPF Information: As used herein, "PPF information" is any information that directly or indirectly indicates a location of a PPF such as, for example, PPF name (FQDN like or similar), PPF address, PPF location, and/or the like.

Note that the description given herein focuses on a 3DPP cellular communications system and, as such, 3DPP terminology or terminology similar to 3DPP terminology is oftentimes used. However, the concepts disclosed herein are not limited to a 3DPP system.

Note that, in the description herein, reference may be made to the term "cell;" however, particularly with respect to NG-RAN concepts, beams may be used instead of cells and, as such, it is important to note that the concepts described herein are equally applicable to both cells and beams.

The technical problem solved by the solution(s) described herein is to achieve optimal UP connectivity between an application client in a UE and an Application Server (AS) deployed in a distributed fashion within a mobile network. The main parts impacting this UP connectivity are the selection of UP termination point function in the RAN, selection of the UPF(s) in the CN, and finally the selection of an AS for the UE. In existing solutions, these three selections are done in an uncoordinated manner with the possibility that the end result is non-optimal UP connectivity.

Commonly owned and assigned Patent Cooperation Treaty (PCT) Patent Application Serial No. PCT/EP2018/ 053135, entitled "COORDINATED SELECTION OF USER PLANE FUNCTIONS IN CORE AND RADIO ACCESS NETWORKS," was filed on Feb. 8, 2018 and claims priority to U.S. Provisional Patent Application Ser. No. 62/479,757, filed Mar. 31, 2017. In this related application, systems and methods are disclosed that provide solutions for coordinating the selection of UP gateways in RAN and CN. The present disclosure extends the solution space also towards application functionality distributed in the mobile networks in the case when also RAN and CN UP functionality is deployed accordingly.

First, the area related to selection of mobile network UP functionality is described. In 3DPP 5G networks, there are several factors impacting the selection of user plane functions (i.e., PPFs) in the 5G RAN (which is also referred to herein as the NG-RAN) and user plane functions (i.e., UPFs) in the 5G Core Network (5GC) (which is also referred to here as the NG Core Network (NGC or NG CN)). Problems arise due to uncoordinated selection of the UP gateways in the core and RANs. In addition to the mobile network functionality (NG-RAN and 5GC), ASs can be located anywhere on the Internet, or closer to the end user (for example on sites that host operator infrastructure, or shared cloud centers). For optimal performance, not only the mobile network topology should be considered, but also the location of the ASs.

Now, aspects impacting distribution of application layer functionality is described. Tier-1 content providers have typically deployed application functionality at limited Internet Exchange Point (IXP) sites and have also started to deploy media delivery related functionality in the network operator sites. The current deployment happens at the National Data Center (NDC) and/or a subset of Regional Data Center (RDC) sites to get closer to the end users and to minimize peering costs. The important question to answer is how distributed in the site topology this deployment will take place in the future, for example if such functionality will also be deployed at all RDC and selected Central Office (CO) sites. Media delivery functionality can be deployed at the CO and RDC sites as long as both RAN PPF and NGC UPF (supporting Local Break-Out (LBO)) are also deployed in a coordinated way. We note also that for 5G networks in general, and with the introduction of network slicing, these types of deployment scenarios become more likely as certain use cases depend on distributed UPFs and ASs. Examples of such use cases are:

- Network slices with local or regional geographical coverage;
- End user applications with high interactivity and very short response times (virtual reality, remote control);
- Applications with very high reliability or very specific security requirements might drive the deployment of the whole UP processing and ASs to specific sites (National Security and Public Safety (NSPS), military, factory automation).

There are different drivers for distribution of application functionality in mobile networks. The working assumption today is that there are minimal reasons to distribute media delivery functionality for Video-on-Demand (VoD) and live/ linear TV use cases when only considering end user Quality of Experience (QoE). This however assumes that the transport network between, e.g., CO site and NDC site provides enough low latency and high bandwidth. Therefore, an important aspect is also if it is feasible for the network operator to upgrade the transport network as needed, or if it is more feasible to deploy application functionality far out in the network. Capital Expenditure (CAPEX) and Operative Expenditure (OPEX) cost comparison between these two options is also an important aspect to consider. Content Delivery Network (CDN) edge functionality provides a fan-out point for media delivery and would decrease the need to upgrade the transport network above the site where CDN edge functionality is deployed. Still another important aspect to consider is the "content or cache hit rates" far out in the network, i.e., to achieve the transport savings there must to exist sufficient number of media consumers for the same content below that site. Predictive prepositioning of content can improve these "content or cache hit rates." Scalability of the media delivery functionality is also impacted by distribution (e.g., less processing and bandwidth is needed deeper in the network compared to deployment at the NDC site).

5G brings the need to support new 5G use cases with low latency and high quality resolution requirements. One example of this is delivery of 360-degree Virtual Reality (VR) video (at 4K, 8K and/or 16K quality) used for live events (such as sport events and concerts). In this case the total latency requirement from eye/head movements to displaying the updated "field of view" VR content is 20 milliseconds (ms) and simultaneously requiring high bandwidth. One possible deployment option is to deploy the related media delivery functionality far out in the network. However, the sweet-spot between increasing the bandwidth versus decreasing the latency is not clear and needs to take into account the above-described aspects for distribution of media delivery functionality.

Therefore, it can safely be assumed that there will be application functionality distributed far out in the mobile networks and that solutions are needed to achieve optimal UP connectivity between an application client in a UE and an AS deployed in a distributed fashion within a mobile network.

FIG. 1 illustrates one example of uncoordinated selection of UPF, PPF, and AS. In this example the selection of UPF and PPF has been done in a coordinated way, i.e. the SMF has selected an UPF function in a RDC site and the RCF has also selected the PPF function in the same RDC site. The selection of AS was done in an uncoordinated way to UPF and PPF selection and the Application Function (AF) logic selected an AS in the CO site due to no coordination between these selections. The end result is the unnecessary tromboning in the transport network as shown in FIG. 1.

Another non-optimal placement may be that the UPF, PPF, and ASs may be placed at different COs. This could for instance be a result of mobility or a poor selection of CO for the PPF after the UPF has been placed.

The problem may not only occur at initial selection of PPF, UPF, and AS, but also at reselection of, e.g., PPF due to load-balancing in RAN, UPF due to load-balancing in CN, or mobility of the UE. It may also happen at any time an AS is selected for the UE.

Systems and methods are disclosed that solve the technical problem of uncoordinated selection of ASs and user plane functions, i.e. UPFs in 5GC and PPFs in NG-RAN, in order to make it possible to optimize routing with reduced UP latency as a result, as well as optimizing the routing costs for the payload.

Embodiments of a method for enabling a collaborative strategy between AF, RAN, and CN to coordinate the selection of AS, PPF, and UPF are disclosed. Note that that the terms PPF and UPF are used herein to refer to the UP gateway in the RAN and the UP gateway in the CN, respectively. The PPF and UPF are typically selected at UE initial attach and can be reselected at UE mobility or for any other local reasons on either RAN or CN side, e.g. load balancing between different PPFs or load balancing between different UPFs. The AS may be selected at any time for the UE and the different mechanisms are totally application dependent.

In some embodiments, a coordinated selection of PPF, UPF, and ASs are made. The needed functions performing these selections, e.g. RCF, SMF, and AF, exchange information about the location of their respective UP related functions enabling a coordinated selection of PPF, UPF, and ASs. Different detailed embodiments are described below.

Figure 2:
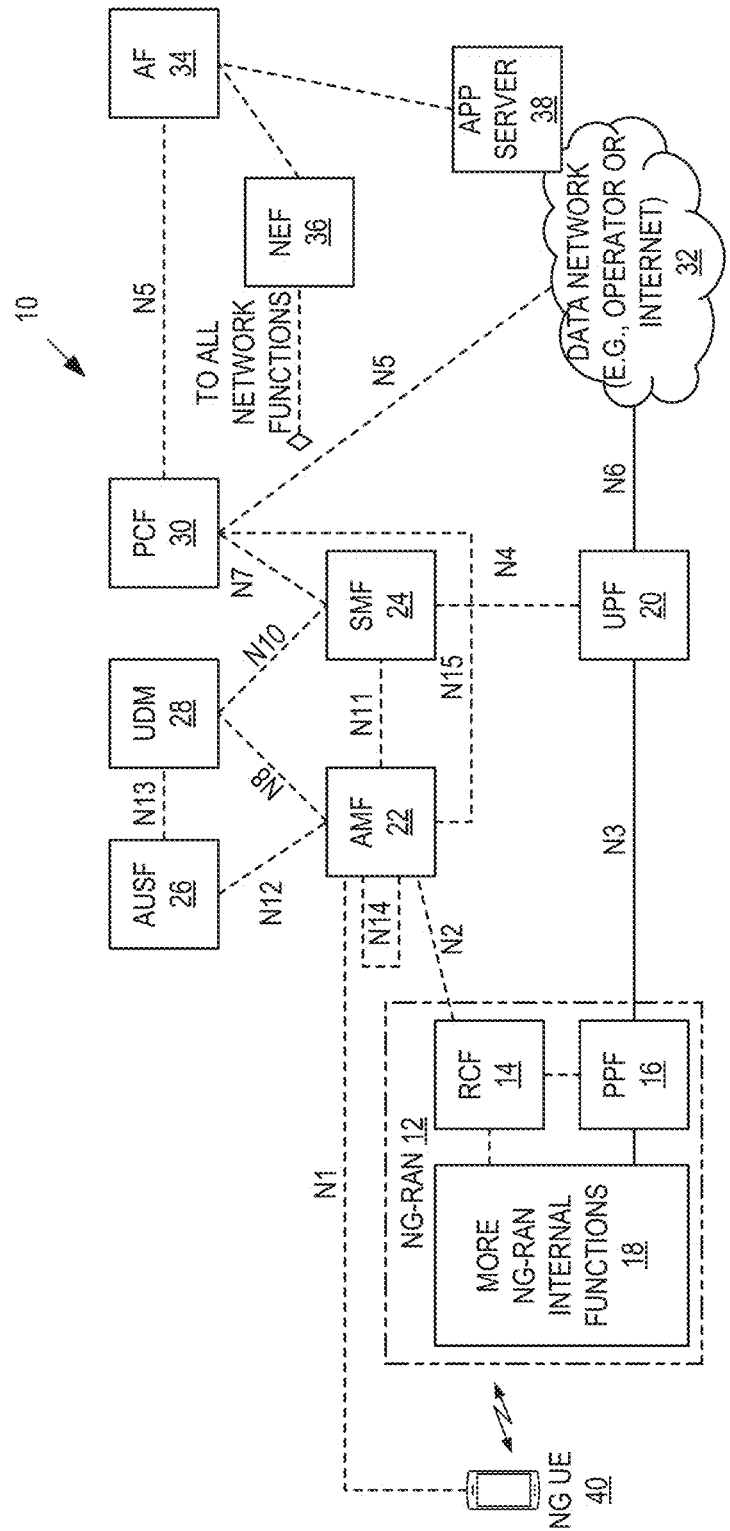
FIG. 2 illustrates one example of a cellular communications network having a Fifth Generation (5G) architecture with a Network Exposure Function (NEF) and application related functionality in which embodiments of the present disclosure may be implemented.

FIG. 2 illustrates one example of a cellular communications network 10 in which embodiments of the present disclosure may be implemented. In this example, the cellular communications network 10 is a 5G network having the illustrated 5G architecture. The 5G architecture includes both PPF and UPF functions, among multiple other functions such as a Network Exposure Function (NEF) 36, an AF 34, and an AS 38. It is worth noting that the "N" interface names are also sometimes referred to as "NG" interface, for example the N11 interface can be called NG11 interface.

As illustrated, the cellular communications network 10 includes a NG-RAN 12 that includes an RCF(s) 14, a PPF(s) 16, and other NG-RAN internal functions 18. Note that in 3DPP the logical node corresponding to the RCF 14 is called CU-CP (Central Unit-Control Plane) and the logical node corresponding to the PPF 16 is called CU-UP (Central Unit-User Plane). The 5GC includes various functions including a UPF(s) 20, an AMF(s) 22, an SMF(s) 24, an Authentication Server Function(s) (AUSF(s)) 26, a User Data Management(s) or Unified Data Management (UDM(s)) 28, and a Policy Control Function(s) (PCF(s)) 30. The UPF(s) 20 are connected to a data network 32. As shown, the PPF(s) 16 are connected to the UPF(s) 20. The functions 14 through 30 may be implemented in one or more CN nodes or, in some implementations, implemented "in the cloud" (e.g., implemented as one or more virtual machines). In addition, the cellular communications network 10 includes a NEF(s) 36. The cellular communications network 10 is used to connect to an AF(s) 34 and an AS(s) 38.

Note that the names used herein for the various functional entities should be construed broadly because the naming of the functional entities, e.g., in 5G is still evolving. Thus, names such as RCF, PPF, AMF, SMF, AUSF, UDM, and PCFs used herein are not limited to only those functional entities having the same names. Rather, these names should be construed broadly to encompass any equivalent functional entity, regardless of the actual names used to refer to those functional entities.

In such a distributed deployment, when a UE 40 is connected, resources for UP communication are selected in the mobile network, in particular the UPF(s) 20 and the PPF(s) 16 supporting that particular UE 40. The selection of the AS 38 happens later on and based on application specific signaling using the connectivity provided by PPF(s) 16 and UPF(s) 20. For this timing reason, it is not obvious today how coordinated selections of PPF 16, UPF 20, and ASs 38 could be achieved.

Figure 3:
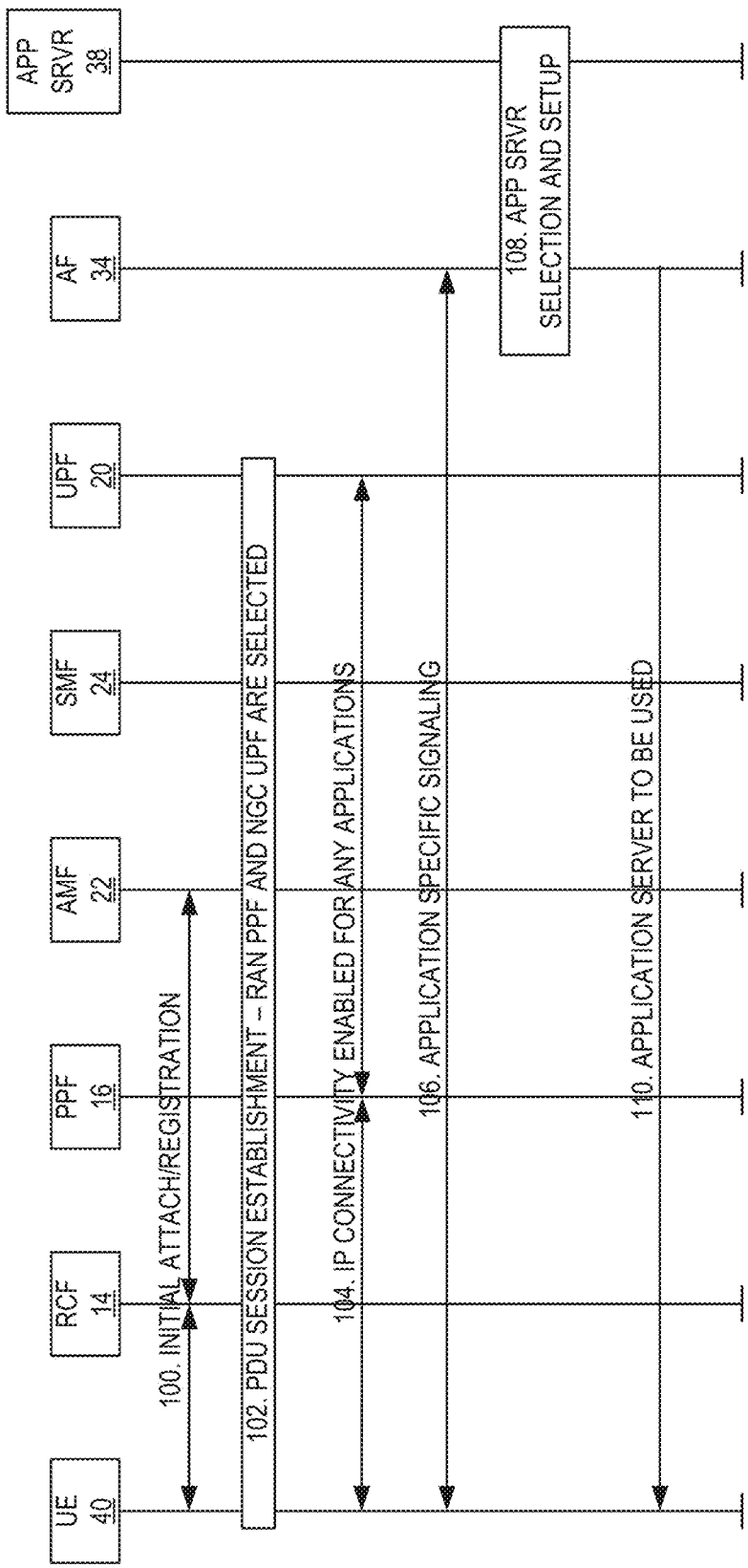
FIG. 3 illustrates conventional UPF and AS selection in an uncoordinated manner.

The signaling flow in FIG. 3 shows, as an example, the case when the PPF 16 and UPF 20 are selected when the UE 40 performs registration to the AMF 22 and when a PDU session is established for the UE 40. The selection of the AS 38 takes place later on and without any coordination towards the selection of the UPF 20 and PPF 16, in the conventional manner. Therefore, the tromboning problem shown in FIG. 1 is one possible outcome of the selections of the UPF 20, PPF 16, and ASs 38 in an uncoordinated manner. As illustrated, the UE 40, the RCF 14, and the AMF 22 perform initial attach and registration (step 100). A PDU session is established in which a PPF 16 and a UPF 20 are selected in the conventional, uncoordinated manner (step 102). Internet Protocol (IP) connectivity is enabled for any applications (step 104), and application specific signaling is exchanged (step 106). The AF 34 then selects and sets up an AS 38 (step 108). An indication of the AS 38 to be used is sent to the UE 40 (e.g., to an application client in the UE 40) (step 110). The AS 38 is selected in an uncoordinated manner with respect to selection of the PPF 16 and the UPF 20. Again, the tromboning problem shown in FIG. 1 is one possible outcome of the selections of the UPF 20, PPF 16, and ASs 38 in an uncoordinated manner.

It is also worth mentioning that the AS selection could possibly take into account the location of the UPF 20, for example by attempting to analyze the UE IP address in the UPF 20 and to resolve the related location. This knowledge could then be used to select an optimal AS for the UPF location. The main problem that remains is, however, that there is no possibility to take into account the different available locations of ASs 38 when the PPF 16 and UPF 20 are selected.

In some embodiments of the present disclosure, a coordinated selection of PPF 16, UPF 20, and AS 38 is made. The needed functions performing these selections, e.g. RCF 14, SMF 24, and AF 34, exchange information about their respective UP related functions enabling a coordinated selection of PPF 16, UPF 20, and AS 38.

An exemplary embodiment is described in the following. This embodiment is based on the RCF 14 providing information about PPF pools to the SMF 24. The SMF 24 combines the received PPF Pool information with UPF Pool information and forwards the combined information to the AF 34. The AF 34 then checks the optimal AS selection and provides information back to SMF 24 and RCF 14 about which UPF and PPF pools are optimal in relation to AS location. Other alternative embodiments are also described below.

In some embodiments, the information shared from the NG-RAN 12 to the CN is a parameter that identifies the PPF 16 by name and/or location and can, as an example, be PPF pool identity, PPF name (FQDN like or similar), PPF address, PPF location, etc. Based on that information, the CN (e.g., the SMF 24) can select the UPF 20, taking the selected PPF 16 into account by mapping the PPF identity/name/location to the different available UPFs 20. This translation can be done locally in the SMF 24 or by looking up a relation between PPF identity/name/location and the UPF identity/name/location in a separate database. The SMF 24 then selects the most optimal UPF 20 based on the PPF selection and other CN internal criteria such as, e.g., load information. The same sharing of information applies also from the CN to the AF 34.

One main principle behind the described solutions is that the SMF 24 can identify an AF 34 related to a PDU session being established. This is vital as the selection of the PPF 16, UPF 20, and ASs 38 are in one sense on PDU session level (or within a PDU session).

If the RCF 14 has multiple PPFs 16 available that may match the characteristics (e.g., Quality of Service (QoS)), the RCF 14 may pass identifiers for the locations of these PPFs 16 (logical locations, e.g. data centers or pools in data centers) to the AMF 22 and further to the SMF 24. The SMF 24 may then match the locations of these identifiers with the list of potential UPFs 20 according to the UPF selection procedure to get a list of optimal locations for the placement of the PPF 16 and the UPF 20.

If an external application with multiple locations is also part of the procedure (e.g., an application in an edge computing setup), the identifiers in the list of optimal placements for the PPF 16 and UPF 20 can also be propagated to the AF 34 for the edge computing application. That AF 34 may then use this list of optimal locations and match that with its own internal locations and limit the list further so that it may select an optimal location in accordance to its needs.

The communication between the SMF 24 (or RCF 14 in the embodiments in which the RCF 14 communicates with the AF 34) and the AF 34 (or edge platform) can be arranged in different ways. In one example, the SMF 24 communicates with the AF 34 or the edge platform through direct signaling using a protocol. In another example, the communication is provided as a service over a Representational State Transfer (REST) based interface. The communication path between the SMF 24 (or RCF 14 again in the embodiments in which the RCF 14 communicates with the AF 34) and the AF 34 or the edge platform can also be arranged in different ways. For example, it may be a direct interface, or it may be arranged via one or more intermediate nodes such as the NEF 36 and PCF 30.

If an AF 34 has limited the list further, or if the list is only limited to the PPF locations and UPF locations, the SMF 24 now can select the UPF 20 to use and configure that UPF 20. Part of this is to define the tunnel termination point for the N3 interface, which is passed along to the RCF 14 together with the location identity of the selected UPF 20. Then the RCF 14 can select a PPF 16 that matches the location of the UPF 20 (and if the UPF 20 is selected to match the AS 38, also matching the application's location announced by the AF 34).

In 3DPP, the identifiers used for the interface between the SMF 24 and the AMF 22 are being standardized and, at this point, it seems as though the location of the processing will be called Data Network Access Identifier (DNAI). For a Data Network Name (DNN), this is the identifier of UPF access to the Data Network (DN). It is used to map UPF location with application location (location is in this definition a logical location—it is rather a resource identifier that is known both by the SMF 24 as well as by the AF 34). With this naming, the DNAI may be then mapped to the logical locations used in the communication between the SMF 24 and the RCF 14 as well, either direct by using the same naming convention or via a translation table between the two naming conventions for the logical locations.

The idea behind the Pool Identifier (ID) (or whatever the ID of a processing location may be called) is that it is an ID that points out different processing locations (e.g., data centers or a subset of resources in a data center) so different parts of the 3DPP network (RAN, NGC, AF) can refer to the processing locations using the same naming convention. In another variant, the information transferred between the NG-RAN, 5GC, and the AF 34 is possible to map or translate by the receiving party to other information more useful for the receiving party. One example is that even the NG-RAN 12 uses PPF Pool IDs, where in this case it is enough that the SMF 24 can translate PPF pool ID into something useful in order to perform UPF selection and for sending some suitable information to the AS 38. The AS 38 can then perform another translation serving the functionality needed by the AS 38.

Figure 4A:
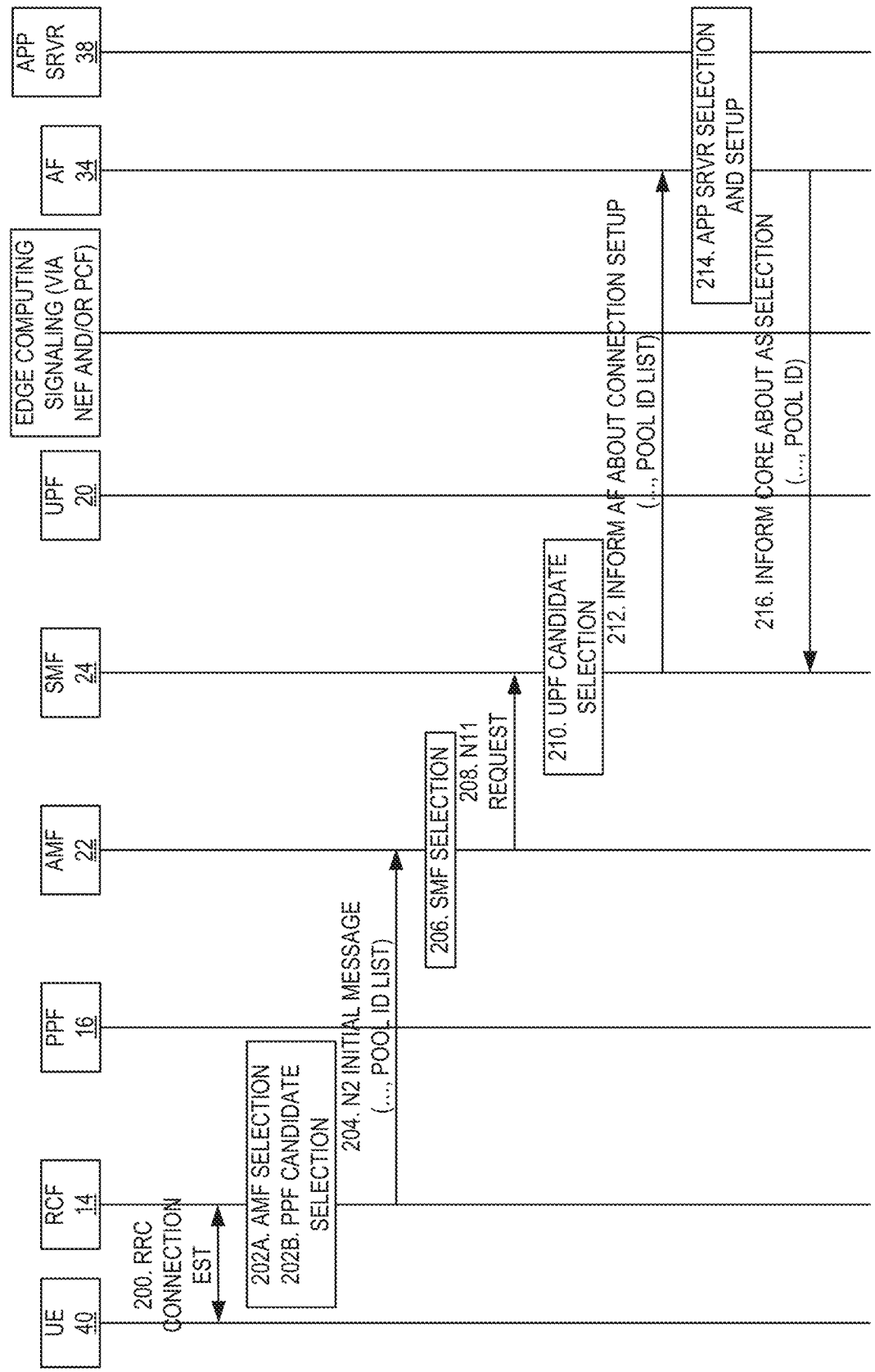
FIGS. 4A through 4C illustrate a process for coordinated selection of AS, UPF, and PPF according to some embodiments of the present disclosure.
Figure 4B:
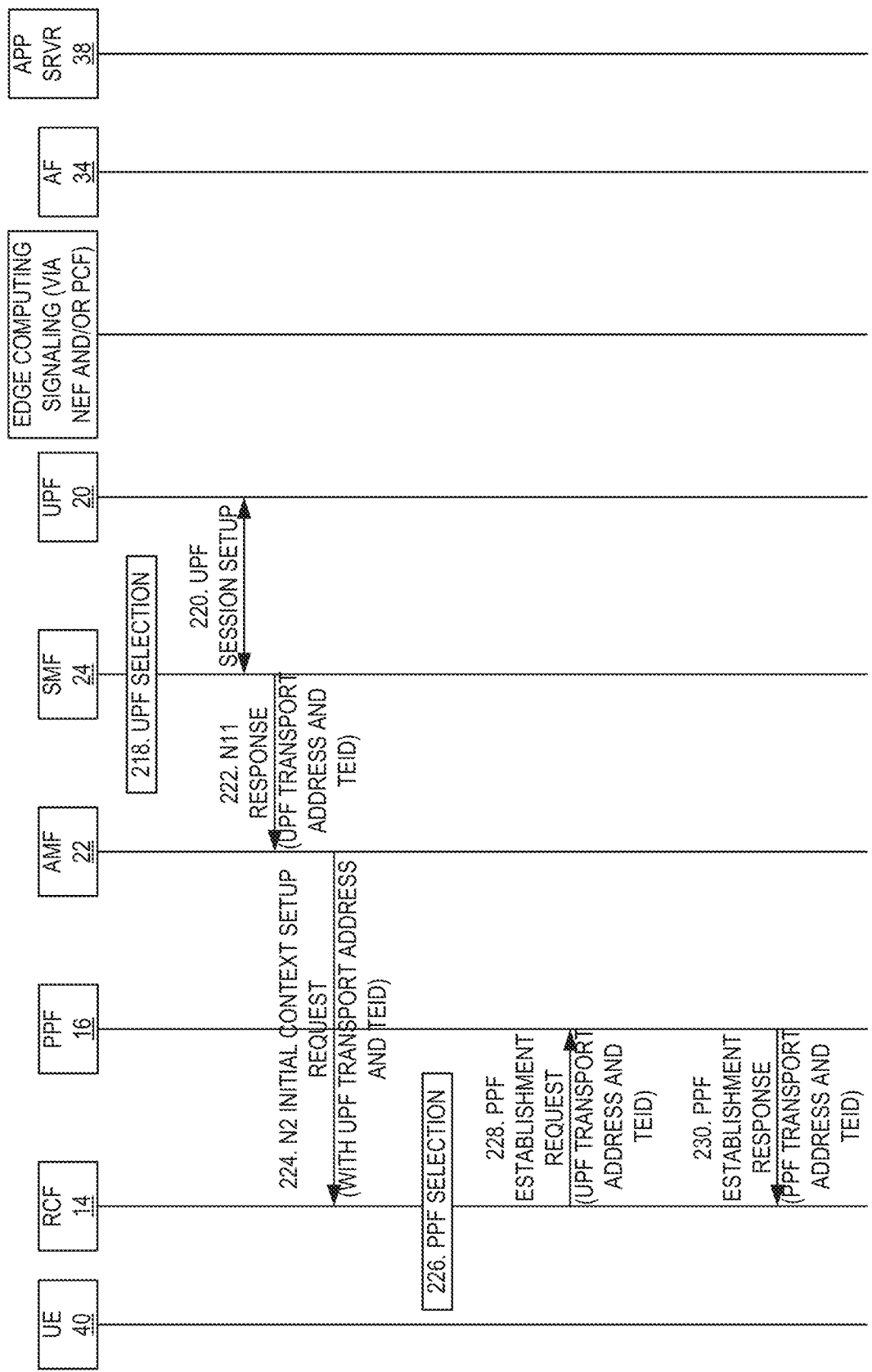
Figure 4C:
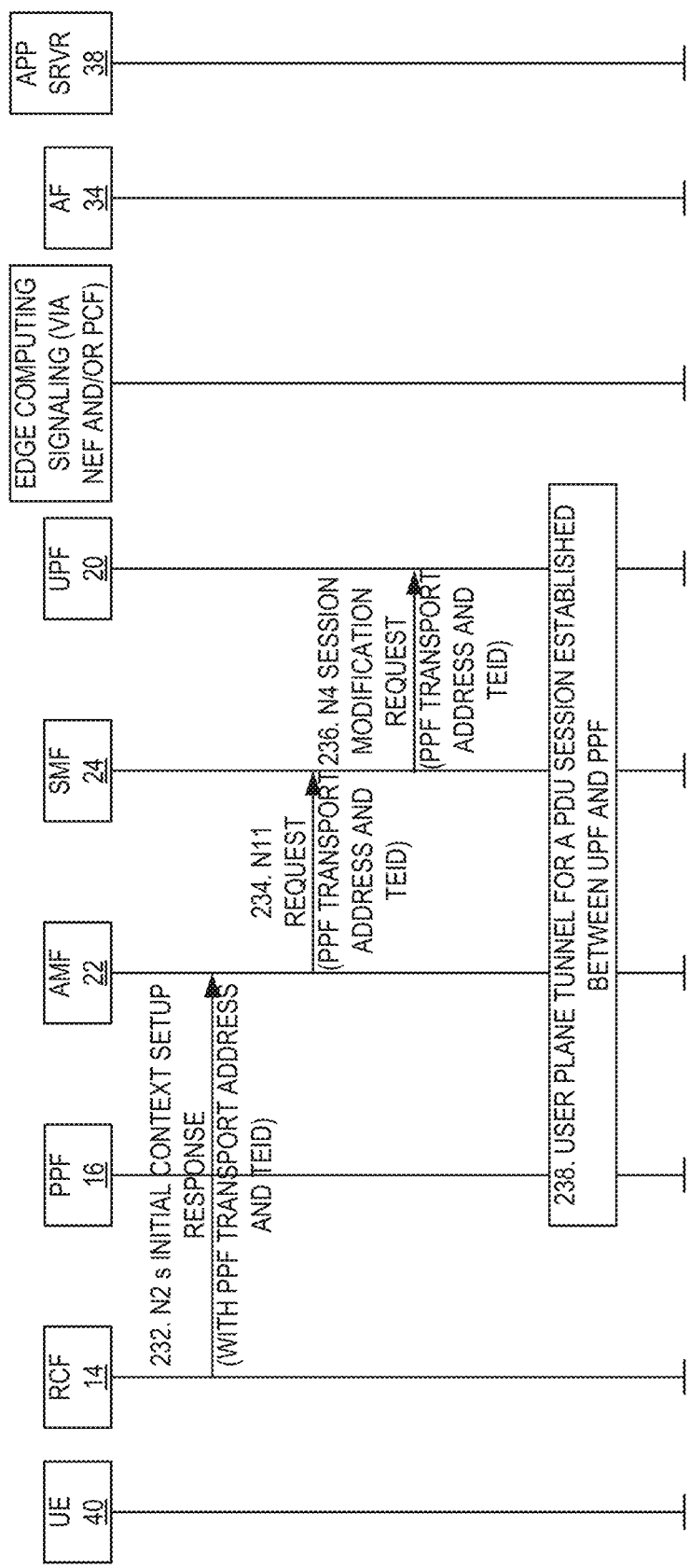

FIGS. 4A through 4C illustrate a process for coordinated selection of a PPF 16, a UPF 20, and an AS 38 according to some embodiments of the present disclosure. The signaling flow in FIGS. 4A and 4B shows, as an example, the case for when a single UPF 20, a single PPF 16, and a single AS 38 are selected for the UE 40 in a coordinated manner. However, the same process applies if multiple UPFs 20 and/or multiple PPFs 16 and/or multiple ASs 38 are selected, in which case there will be multiple PDU sessions and corresponding exchanges of information for coordinated selection of UPFs 20, PPFs 16, and ASs 38.

As illustrated, the UE 40 and the RCF 14 operate to establish a Radio Resource Control (RRC) connection (step 200). The RCF 14 selects an AMF 22 (step 202A) and selects a number of candidate PPFs 16 (step 202B). The RCF 14 sends an N2 initial message to the AMF 22, where this message includes, in this example, a list of PPF Pool IDs or other PPF Pool information for candidate PPFs 16 (step 204). Alternatively, the candidate PPFs 16 may be indicated by PPF information. The AMF 22 selects a SMF 24 (step 206) and sends an N11 request to the selected SMF 24 (step 208). The N11 request includes the information regarding the candidate PPFs 16 from the N2 initial message (e.g., the list of PPF pool IDs for the candidate PPFs 16). The SMF 24 selects a number of candidate UPFs 20, e.g., based on the information regarding the candidate PPFs 16 (step 210) and sends a message to the AF 34 that informs the AF 34 about connection setup (step 212). This message sent to the AF 34 includes information regarding the candidate PPFs 16 and the candidate UPFs 20. For example, the message sent to the AF 34 may include the list of PPF Pool IDs for the candidate PPFs 16 and a list of UPF Pool IDs for the candidate UPFs 20 or information obtained by combining the list of PPF Pool IDs and the list of UPF pool IDs. As another example, as also discussed herein, the message sent to the AF 34 may include combined information, where the combined information is a combination of the list of PPF Pool IDs and the list of UPF pool IDs. The AF 34 then selects an AS 38 based on the information regarding the candidate PPFs 16 and the candidate UPFs 20 and sets up the selected AS 38 (step 214). The AF 34 sends a message to the SMF 24 that includes information that informs the CN of the selected AS 38 (step 216). This information may include, for example, an indication of at least one of the PPF pools (or alternatively at least one of the candidate PPFs 16) and/or at least one of the UPF pools (or alternatively at least one of the candidate UPFs 20) that is optimal or preferred considering the selected AS 38. Alternatively, the information sent from the AF 34 to the SMF 24 may include information that identifies the selected AS 38, a location of the selected AS 38, or any other information that enables a UPF 20 and/or a PPF 16 to be selected in a manner that is coordinated with, or takes into account, the selected AS 38.

The SMF 24 then selects a UPF 20 for the Protocol Data Unit (PDU) session for the UE 40 based on the information regarding the selected AS 38 received from the AF 34 (step 218) and sets up a UPF session with the selected UPF 20 (step 220). The SMF 24 sends a N11 response to the AMF 22 that includes information regarding the selected UPF 20 (e.g., UPF transport address and UPF Tunnel Endpoint Identifier (TEID) and potentially UPF pool information or UPF information for the selected UPF 20) (step 222). The AMF 22 sends an N2 initial context setup request to the RCF 14 that includes the information regarding the selected UPF 20 (step 224). The RCF 14 then selects a PPF 16, e.g., from the previously selected candidate PPFs 20 (or from the candidate PPFs 20 in the at least one PPF pool indicated by the AF 34 in some embodiments) (step 226). The RCF 14 then sends a PPF establishment request to the selected PPF 16 that includes the transport address and TEID of the selected UPF 20 (step 228) and receives a PPF establishment response from the selected PPF 16 that includes the transport address and TEID of the selected PPF 16 (step 230).

The RCF 14 sends an N2 initial context setup response to the AMF 22 that includes the transport address and TEID of the selected PPF 16 (step 232), the AMF 22 forwards the transport address and TEID of the selected PPF 16 to the SMF 24 in an N11 request (step 234), and the SMF 24 then forwards the transport address and TEID of the selected PPF 16 to the UPF 20 in an N4 session modification request (step 236). The PPF 16 and the UPF 20 then establish a UP tunnel for a PDU session between the PPF 16 and the UPF 20 for the UE 40 (step 238).

A couple of examples of how this signaling diagram of FIGS. 4A through 4C may be reduced for different use-cases are:

1. If an AF 34 and AS 38 are not available for the session to setup, then signaling to the AF 34 and AS 38 is not included and no further limitation of the locations based on application desires would be needed.
2. If the NG-RAN 12 has no preference for the location, no Pool ID needs to be sent along to the CN, then the CN instead can select the candidate Pool IDs freely and communicate these to the AF 34. Selection of AS Pool ID is then done as in the generic case. The UPF 20 is selected by the SMF 24 and the Pool ID for this is communicated to the RCF 14 in the RAN together with the transport address and TEID. Then the RCF 14 can use the communicated Pool ID to select the most optimal location.

In the embodiments described above, the RCF 14 provides information about PPF Pools for candidate PPFs 16 to the SMF 24. In some embodiments, the SMF 24 combines the received PPF Pool information with UPF Pool information for selected candidate UPFs 20 and forwards the combined information to the AF 34. In some embodiments, the AF 34 then checks the optimal AS selection and provides information back to the SMF 24 and RCF 14 about which UPF and PPF pools that are optimal in relation to location of ASs, in some embodiments.

Figure 5:
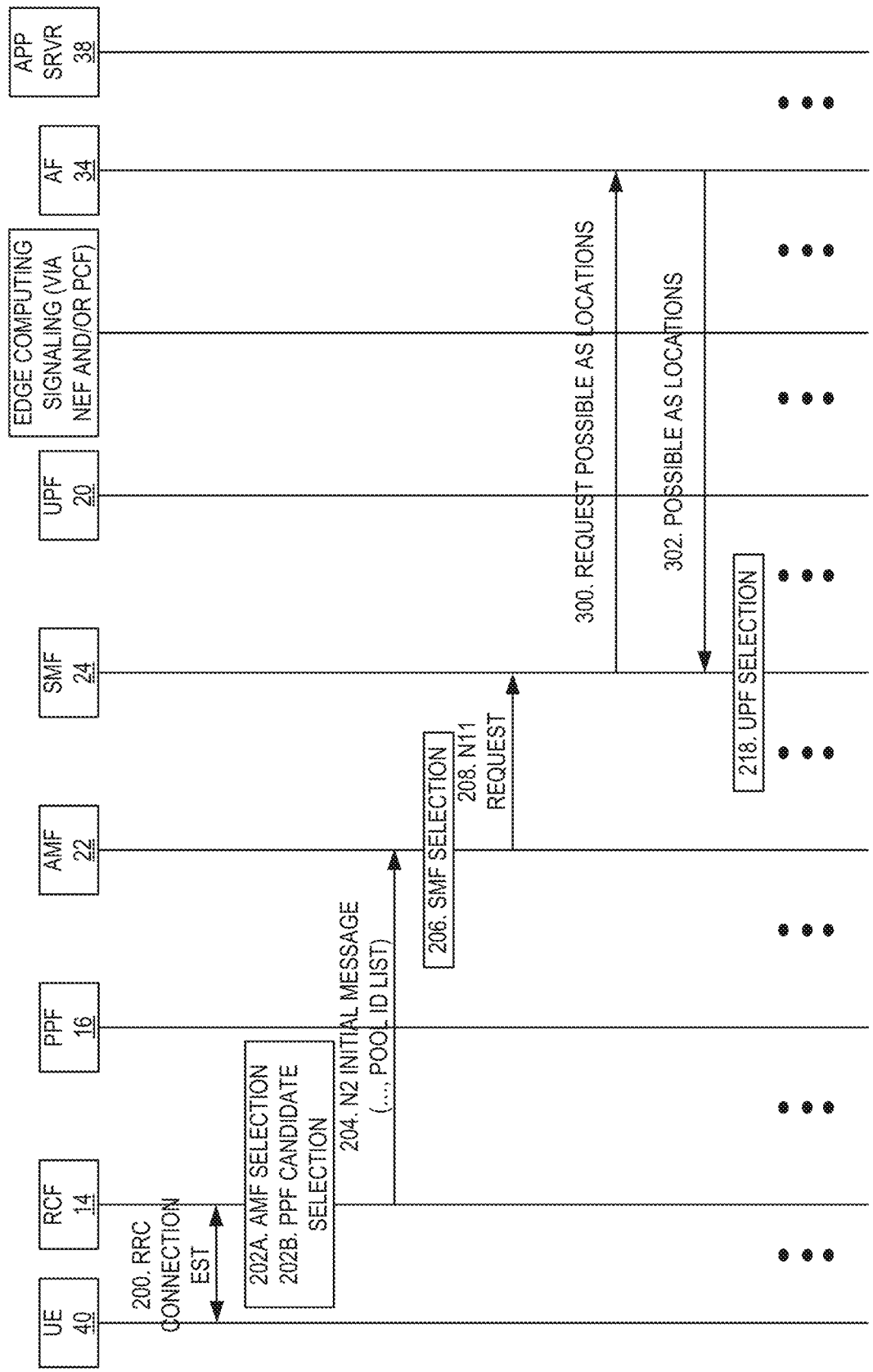
FIGS. 5 through 9B illustrate some example alternative embodiments of the present disclosure.
Figure 6A:
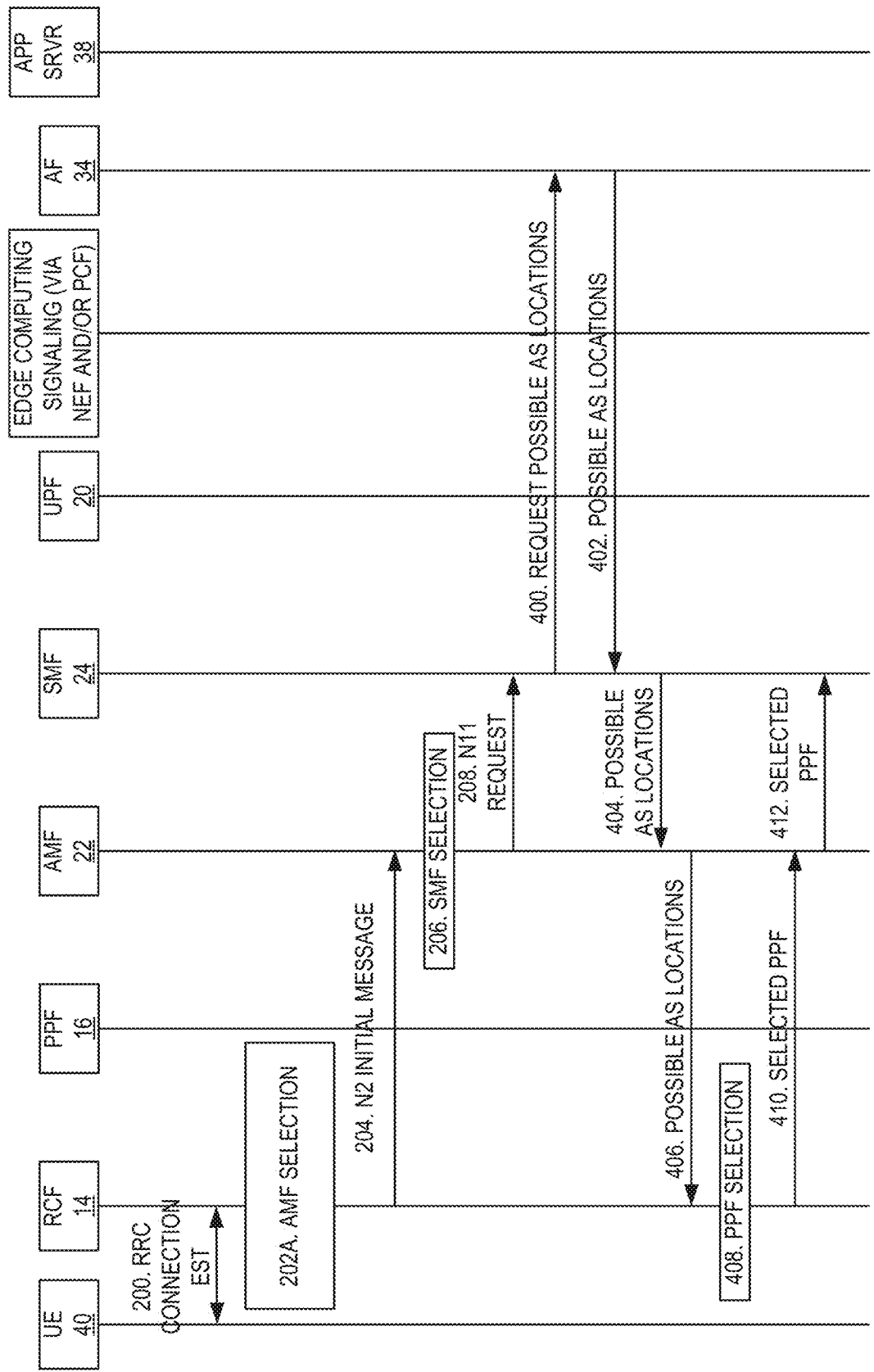
Figure 6B:
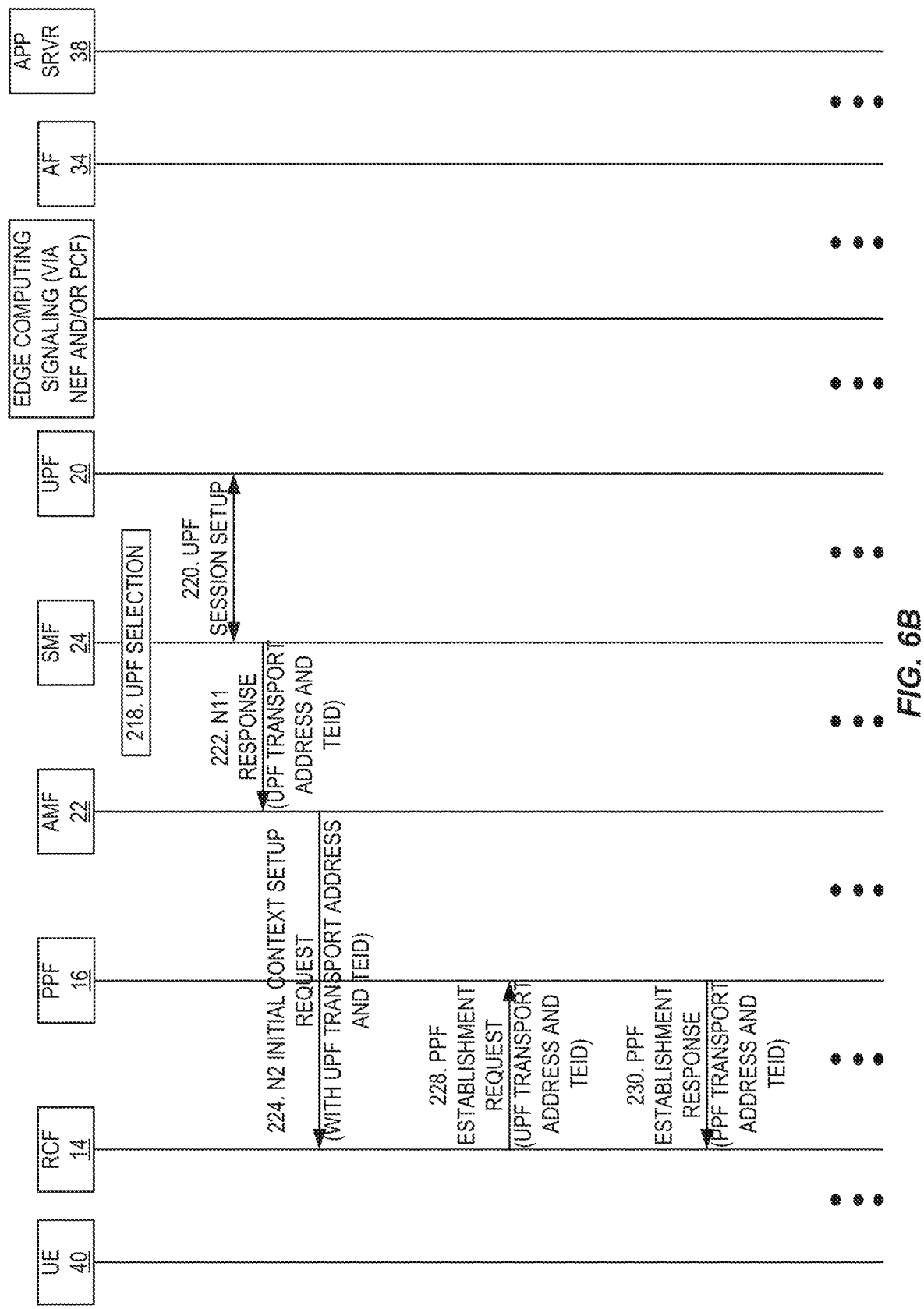

The following other embodiments are also possible. In these cases, the mobile network topology is not exposed outside of the mobile network:

1. The SMF 24 asks AF 34 for possible AS locations and uses this information for UPF selection. The RAN (e.g., RCF 14) takes into account the selected UPF 20 when selecting a PPF 16. One example of this is illustrated in FIG. 5, which is a modified version of the process of FIGS. 4A through 4C. In this example, steps 210 through 216 of FIGS. 4A through 4C are replaced with steps 300 and 302. In particular, in step 300, the SMF 24 requests possible AS locations from the AF 34. In step 302, the AF 34 returns possible AS locations to the SMF 24 (step 302). Then, for UPF selection in step 218, the SMF 24 selects a UPF based on the possible AS locations received from the AF 34 and the PPF candidates (e.g., list of PPF pools of the candidate PPFs) received from the RCF 14 via the AMF 22 in step 208. From this point, the process continues as described above with respect to FIGS. 4A through 4C.
2. The SMF 24 asks AF 34 for possible AS locations and provides this information to the RCF 14 for PPF selection. The SMF 24 then takes into account the selected PPF 16 when selecting a UPF 20. One example of this is illustrated in FIGS. 6A and 6B, which is a modified version of the process of FIGS. 4A through 4C. In this example, PPF candidate selection in step 202B is not performed and, as such, the information regarding the candidate PPFs is not included in the N2 initial message in step 204. Further, steps 210 through 216 of FIGS. 4A through 4C are replaced with steps 400 through 412. In particular, the SMF 24 requests possible AS locations from the AF 34 (step 400). The AF 34 returns possible AS locations to the SMF 24 (step 402). The SMF 24 provides the possible AS locations to the AMF 22 (step 404), and the AMF 22 provides the possible AS locations to the RCF 14 (step 406). Note that step 406 would typically be included in step 224, i.e. that possible AS locations in step 406 would typically be included as part of the initial context setup request in step 204. The RCF 14 then performs PPF selection based on the possible AS locations to thereby select a PPF 16 for the session (step 408). The RCF 14 provides information regarding the selected PPF (e.g., PPF information or PPF pool information) to the AMF 22 (step 410), and the AMF 22 provides this information to the SMF 24 (step 412). The process then continues at step 218 as described above with respect to FIGS. 4A through 4C except that UPF selection in step 218 is performed based on the information regarding the selected PPF and PPF selection in step 226 is not needed since PPF selection has already been performed.

Figure 7A:
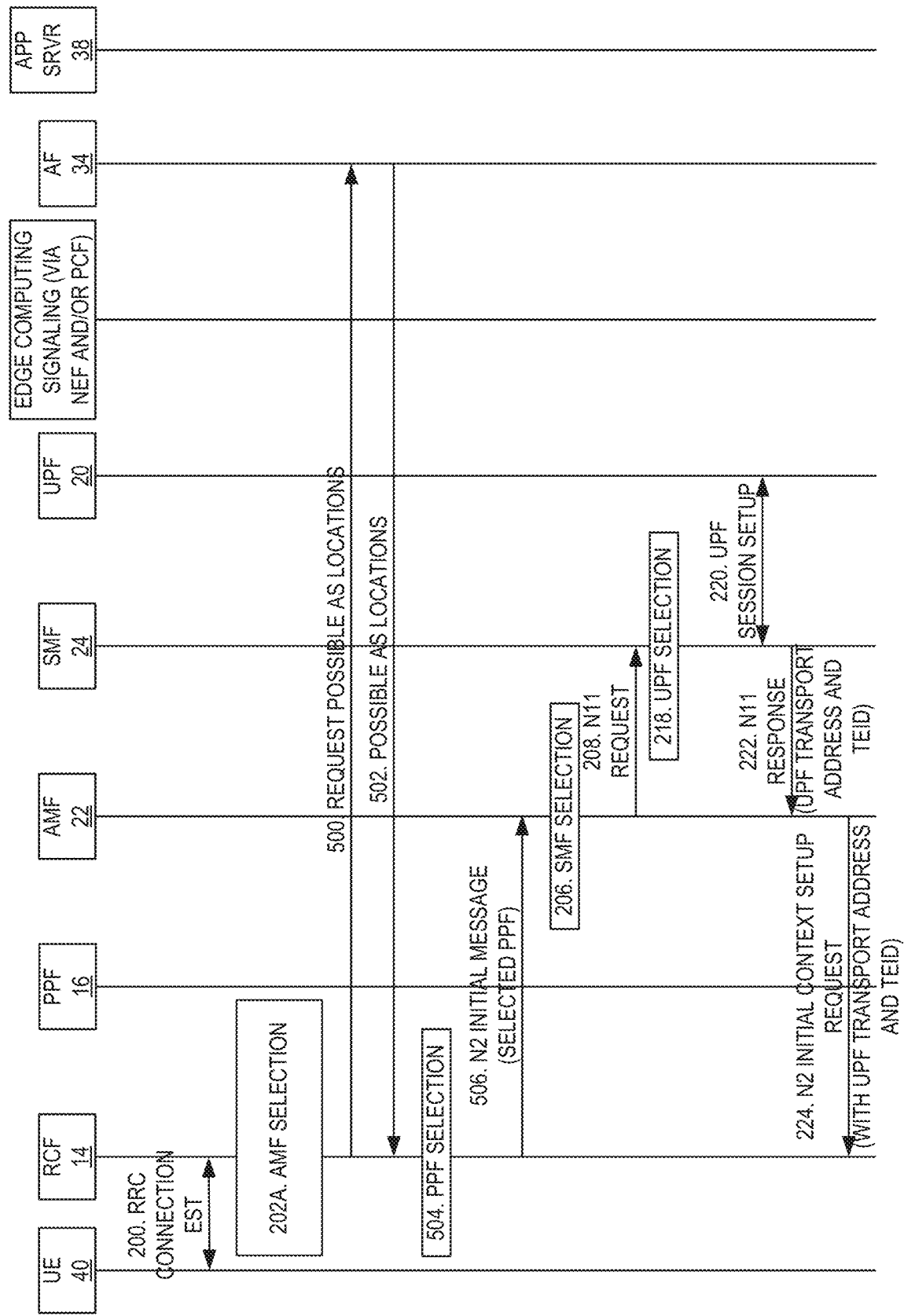
Figure 7B:
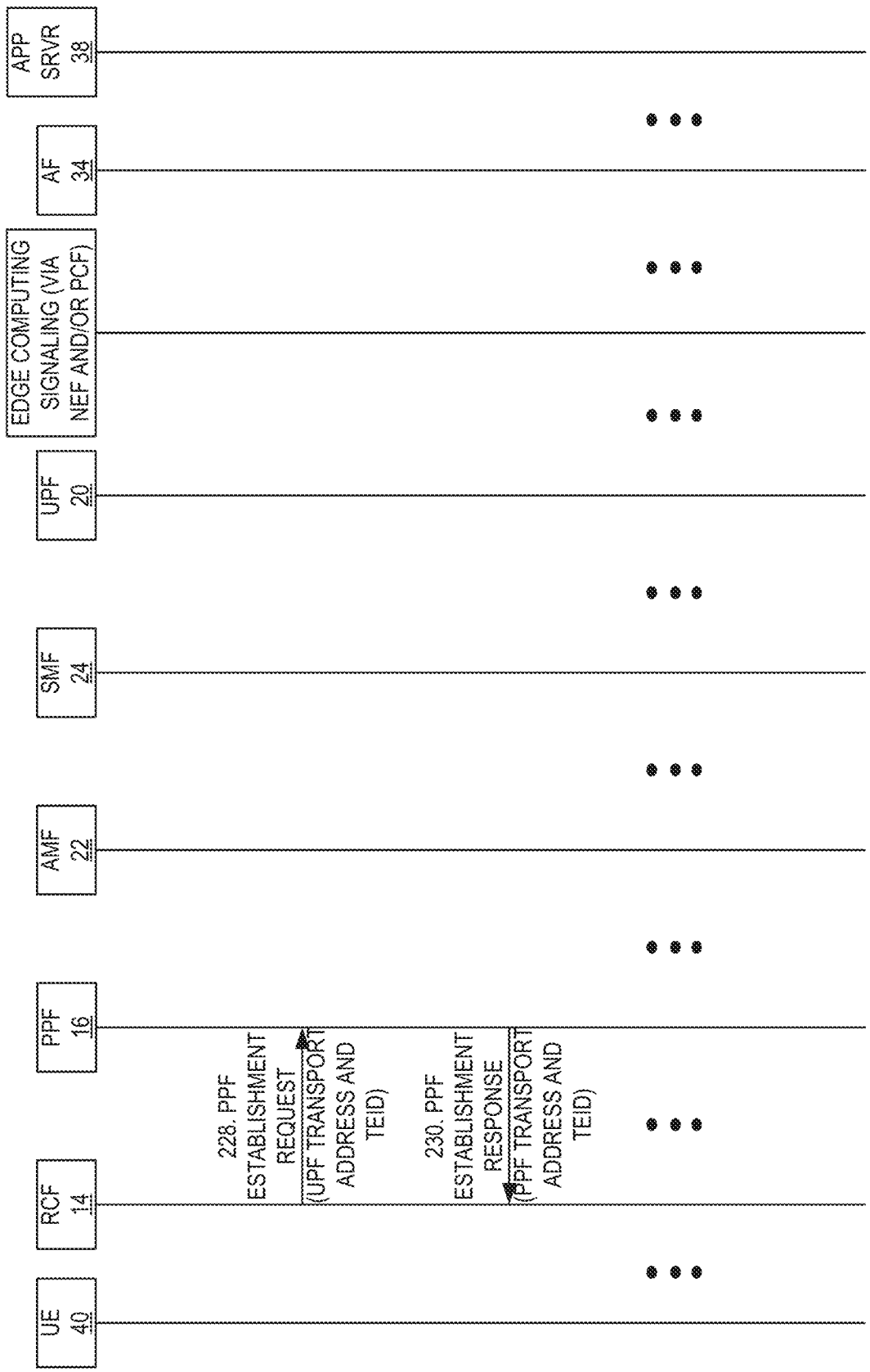

3. The RCF 14 asks AF 34 for possible AS locations and uses this information for PPF selection. The SMF 24 then takes into account the selected PPF 16 when selecting a UPF 20. One example of this is illustrated in FIGS. 7A and 7B, which is a modified version of the process of FIGS. 4A through 4C. In this example, PPF candidate selection in step 202B is not performed. In this example, the RCF 14 requests possible AS locations from the AF 34 via a direct or indirect interface (step 500). The AF 34 returns possible AS locations to the RCF 14 via the direct or indirect interface (step 502). The RCF performs PPF selection based on the possible AS locations to thereby select a PPF 16 for the session (step 504). The RCF 14 sends a N2 Initial Message to the selected AMF 22, where in this example the N2 Initial Message includes information regarding the selected PPF 16 (e.g., PPF information or PPF pool information) (step 506). The process then continues at step 206 as described above except that UPF selection is based on the selected PPF 16 and PPF selection in step 226 is not needed since PPF selection has already been performed in step 504.

Figure 8A:
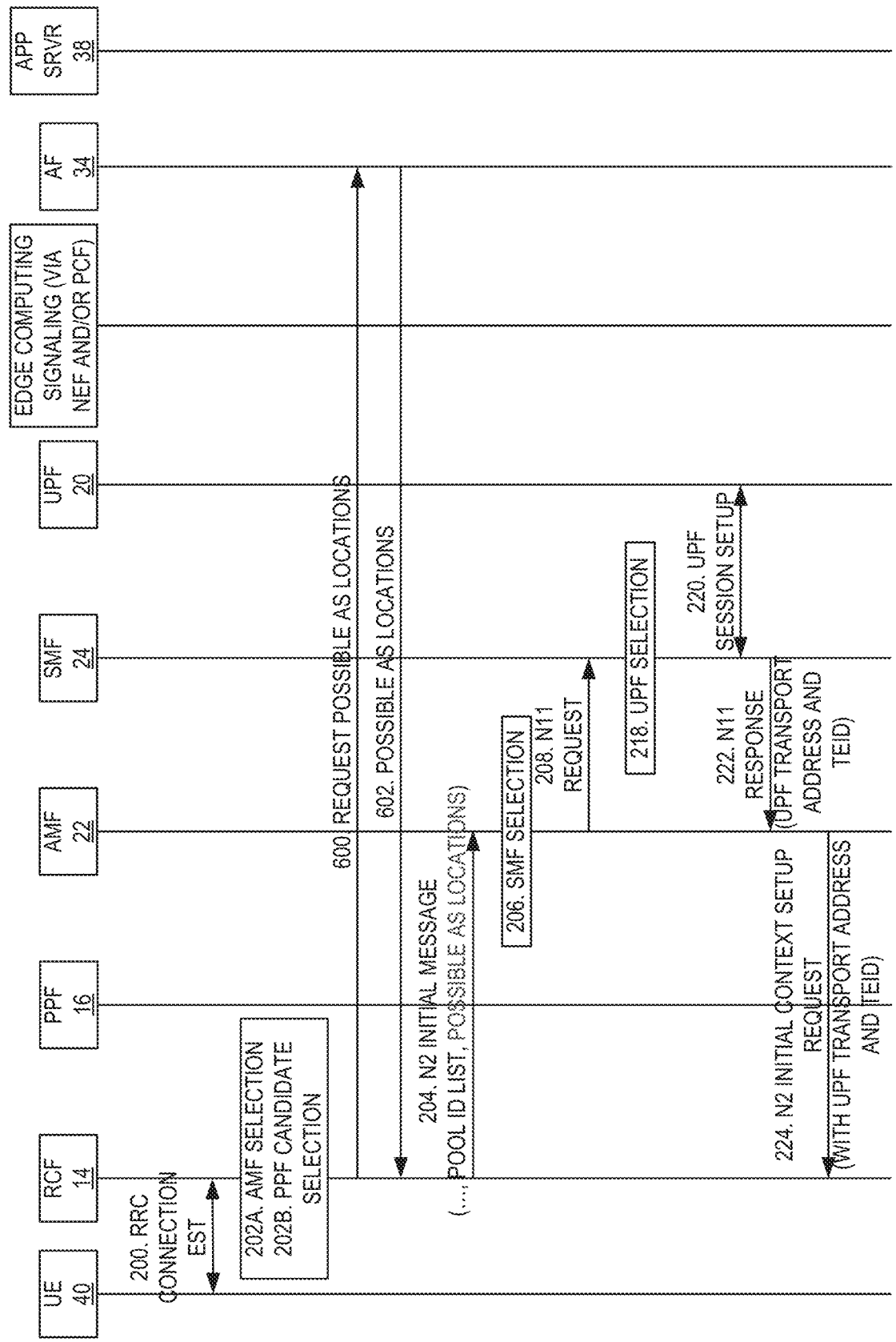

4. The RCF 14 asks AF 34 for possible AS locations and provides this information to SMF 24 for UPF selection. The RAN (e.g., RCF 14) takes into account the selected UPF when selecting a PPF 16. One example of this is illustrated in FIGS. 8A and 8B, which is a modified version of the process of FIGS. 4A through 4C. In this example, the RCF 14 requests possible AS locations from the AF 34 via a direct or indirect interface (step 600). The AF 34 returns possible AS locations to the RCF 14 via the direct or indirect interface (step 602). In this example, in step 204, the RCF 14 includes the possible AS locations along with the information regarding the candidate PPFs in the N2 Initial Message. The possible AS locations and the information regarding the candidate PPFs is also included in the N11 Request in step 208. Steps 210 through 216 are not performed in this example since AS related information is not obtained by the SMF 24 from the AF 34 in this embodiment. The process continues as described above starting at step 218 except that UPF selection is performed based on the possible AS locations and the information regarding the candidate PPFs obtained by the SMF 24 from the RCF 14 via the AMF 22.

Figure 9A:
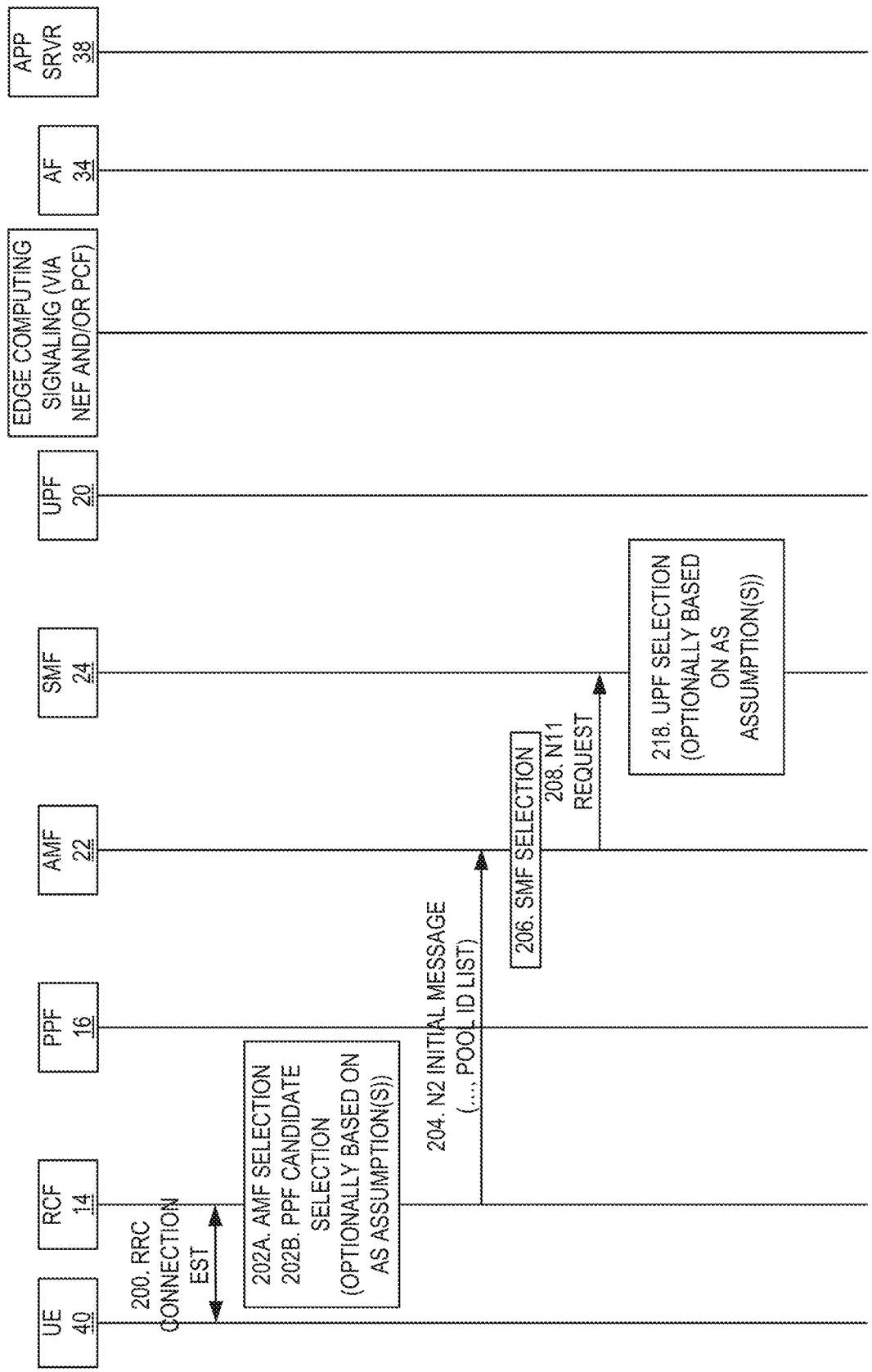
Figure 9B:
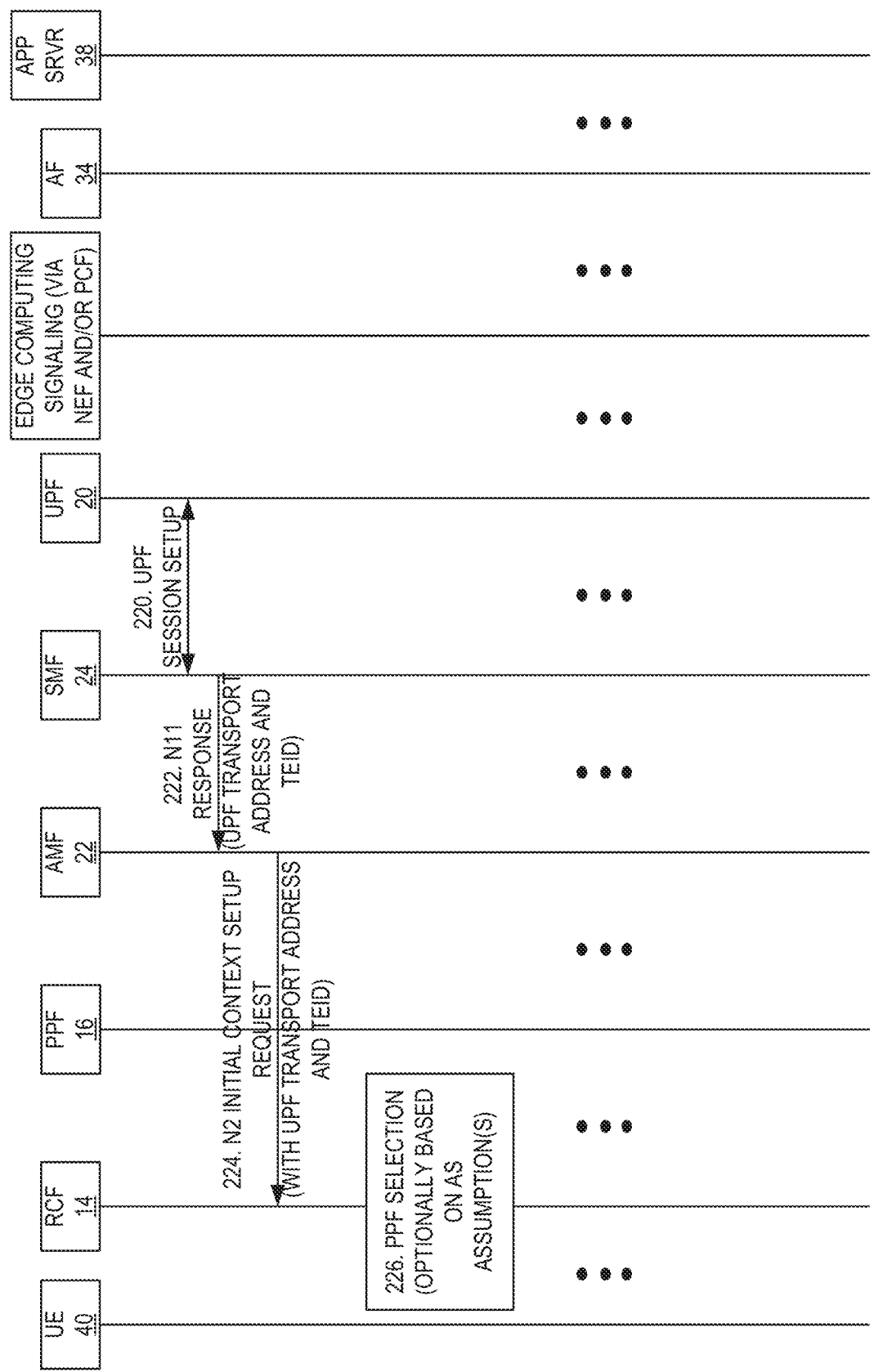

5. The NG-RAN/5GC might make assumptions on application and AS without specific signaling (steps 212, 214, 216 in FIGS. 4A through 4C), based on for example packet inspection, IP address, Domain Name System (DNS) requests, slice identities, UE capabilities . . . ) and from that perform a coordinated UP selection, although not explicitly signaled to the AS. One example of this is illustrated in FIGS. 9A and 9B, which is a modified version of the process of FIGS. 4A through 4C. In this example, PPF candidate selection in step 202B, UPF selection in step 218, and/or PPF selection in step 226 are performed based on one or more AS assumptions. Steps 212 through 216 are not included in this embodiment. Otherwise, the process is the same as described above with respect to FIGS. 4A through 4C.

Still another important aspect is the timing issue described earlier in the present disclosure. This timing issue relates to the PPF 16 and UPF 20 being selected earlier in time than ASs 38. The PPF 16 and UPF 20 provide the UP connectivity later used for application specific signaling and selection of ASs. This means that the AF 34 needs to store the AS selected for a UE and application client during UPF and PPF selection. Once the application client contacts the AF 34, then the stored AS is used.

Although this description has focused on the initial selection of UP/AF resources, additional embodiments might cover also the situation of that the UP and/or ASs are changed, due to for example the following reasons:

Due to UE mobility, PPF, UPF, or both are relocated, or an additional UPF is added.

The application layer might decide to relocate the AS for any reason. This might lead to that the mobile network relocates the PPF/UPF functions as well.

The description is mainly given in relation to 5G networks, i.e. 5G CN and NG-RAN. Aspects of the present disclosure do, however, apply to any mobile networks in which user plane functions and ASs are selected in an uncoordinated way between CN, RAN, and AF. One example is the case when the splitting of the RAN into to RCF and PPF is applied to another Radio Access Technology (RAT), for example for LTE. Another example is the existing LTE architecture with a complete eNB as also in this case the selection of UP terminations is done in an uncoordinated way. The RAN side, i.e. the eNB, is selected, e.g., when the UE connects to the eNB and the UP termination is selected simultaneously, while the CN side is selected later on and not necessarily taking into account the eNB location.

Figure 10:
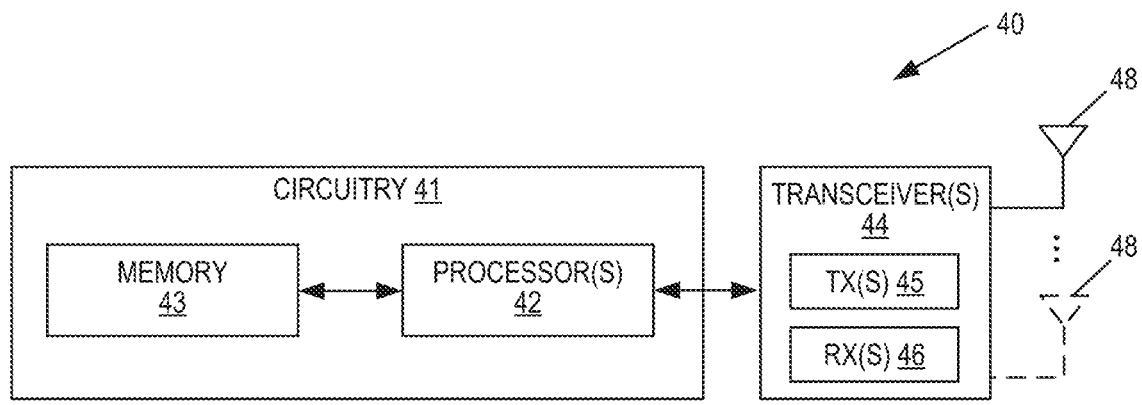
FIGS. 10 and 11 are block diagrams of example embodiments of a wireless device or User Equipment device (UE)

FIG. 10 is a schematic block diagram of the UE 40 according to some embodiments of the present disclosure. As illustrated, the UE 40 includes circuitry 41 comprising one or more processors 42 (e.g., Central Processing Units (CPUs), Application Specific Integrated Circuits (ASICs), Field Programmable Gate Arrays (FPGAs), Digital Signal Processors (DSPs), and/or the like) and memory 43. The UE 40 also includes one or more transceivers 44 each including one or more transmitters 45 and one or more receivers 46 coupled to one or more antennas 48. In some embodiments, the functionality of the UE 40 described above may be implemented in hardware (e.g., via hardware within the circuitry 41 and/or within the processor(s) 42) or be implemented in a combination of hardware and software (e.g., fully or partially implemented in software that is, e.g., stored in the memory 43 and executed by the processor(s) 42).

In some embodiments, a computer program including instructions which, when executed by the at least one processor 42, causes the at least one processor 42 to carry out at least some of the functionality of the UE 40 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 11:
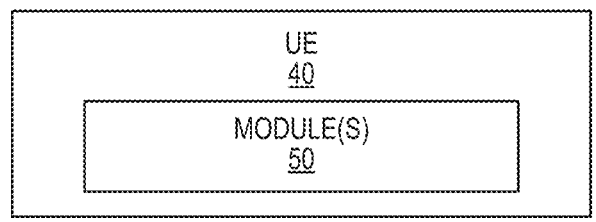

FIG. 11 is a schematic block diagram of the UE 40 according to some other embodiments of the present disclosure. The UE 40 includes one or more modules 50, each of which is implemented in software. The module(s) 50 provide the functionality of the UE 40 described herein.

Figure 12:
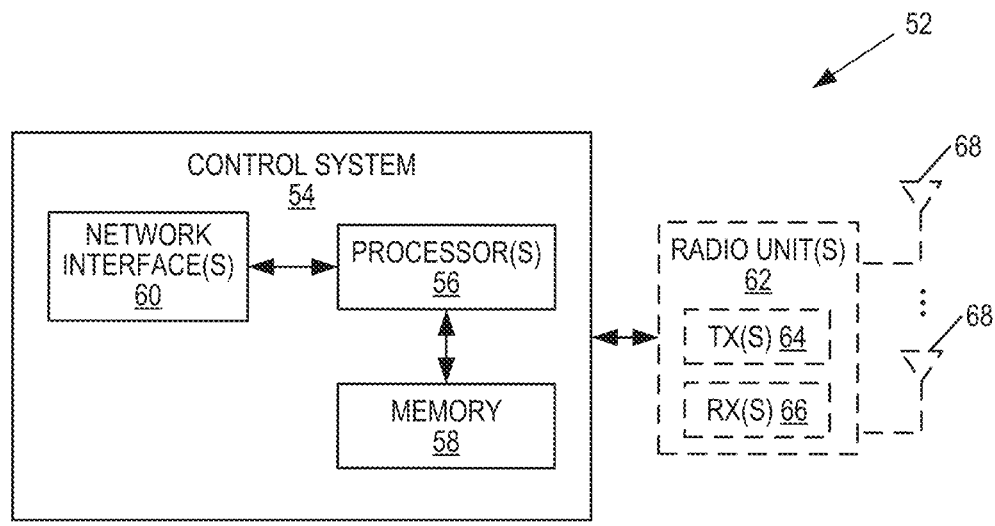
FIGS. 12 through 14 are block diagrams of example embodiments of a network node.

FIG. 12 is a schematic block diagram of a network node 52 (e.g., a radio access node such as, for example, an eNB or gNB or a CN node) according to some embodiments of the present disclosure. In this example, the network node 52 is a physical network node. As illustrated, the network node 52 includes a control system 54 that includes circuitry comprising one or more processors 56 (e.g., CPUs, ASICs, DSPs, FPGAs, and/or the like) and memory 58. The control system 54 also includes a network interface 60. In embodiments in which the network node 52 is a radio access node, the network node 52 may also include one or more radio units 62 that each include one or more transmitters 64 and one or more receivers 66 coupled to one or more antennas 68. In some embodiments, the functionality of the PPF 16, the AMF 22, the SMF 24, the UPF 20, or the AF 34 described above may be fully or partially implemented in the network node 52 as software that is, e.g., stored in the memory 58 and executed by the processor(s) 56.

Figure 13:
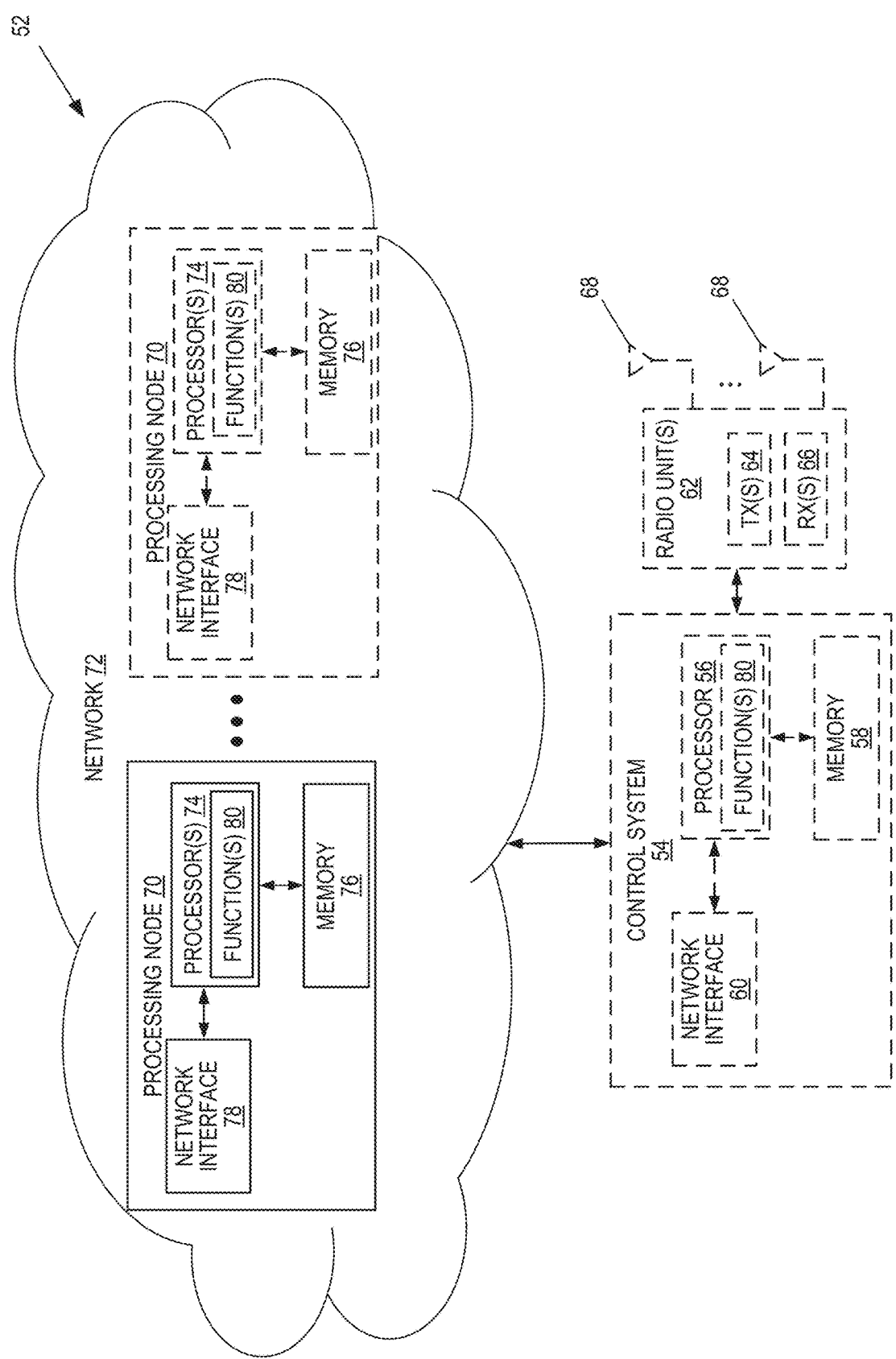

FIG. 13 is a schematic block diagram that illustrates a virtualized embodiment of the network node 52 (e.g., a radio access node or a CN node) according to some embodiments of the present disclosure. As used herein, a "virtualized" network node 52 is a network node 52 in which at least a portion of the functionality of the network node 36 is implemented as a virtual component (e.g., via a virtual machine(s) executing on a physical processing node(s) in a network(s)). As illustrated, the network node 52 optionally includes the control system 54, as described with respect to FIG. 12. In addition, if the network node 52 is a radio access node, the network node 52 may also include the one or more radio units 62, as described with respect to FIG. 12. The control system 54 (if present) is connected to one or more processing nodes 70 coupled to or included as part of a network(s) 72 via the network interface 60. Alternatively, if the control system 54 is not present, the one or more radio units 62 (if present) are connected to the one or more processing nodes 70 via a network interface(s). Alternatively, all of the functionality of the network node 52 described herein may be implemented in the processing nodes 70. Each processing node 70 includes one or more processors 74 (e.g., CPUs, ASICs, DSPs, FPGAs, and/or the like), memory 76, and a network interface 78.

In this example, functions 80 of the network node 52 (e.g., the functionality of the RCF 14, the PPF 16, the AMF 22, the SMF 24, the UPF 20, or the AF 34 described above) described herein are implemented at the one or more processing nodes 70 or distributed across the control system 54 (if present) and the one or more processing nodes 70 in any desired manner. In some particular embodiments, some or all of the functions 80 of the network node 52 described herein are implemented as virtual components executed by one or more virtual machines implemented in a virtual environment(s) hosted by the processing node(s) 70. As will be appreciated by one of ordinary skill in the art, additional signaling or communication between the processing node(s) 70 and the control system 54 (if present) or alternatively the radio unit(s) 62 (if present) is used in order to carry out at least some of the desired functions. Notably, in some embodiments, the control system 54 may not be included, in which case the radio unit(s) 62 (if present) communicates directly with the processing node(s) 70 via an appropriate network interface(s).

In some particular embodiments, higher layer functionality (e.g., layer 3 and up and possibly some of layer 2 of the protocol stack) of the network node 52 may be implemented at the processing node(s) 70 as virtual components (i.e., implemented "in the cloud") whereas lower layer functionality (e.g., layer 1 and possibly some of layer 2 of the protocol stack) may be implemented in the radio unit(s) 62 and possibly the control system 54.

In some embodiments, a computer program including instructions which, when executed by the at least one processor 56, 74, causes the at least one processor 56, 74 to carry out the functionality of the network node 52 or a processing node 70 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 76).

Figure 14:
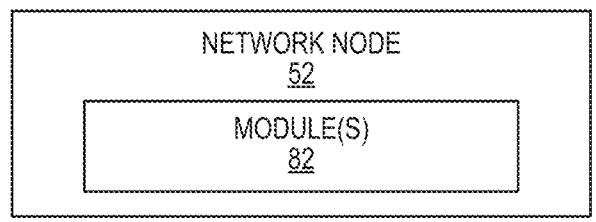

FIG. 14 is a schematic block diagram of the network node 52 (e.g., a radio access node or a core network node) according to some other embodiments of the present disclosure. The network node 52 includes one or more modules 82, each of which is implemented in software. The module(s) 82 provide, in some embodiments, the functionality of the RCF 14, the PPF 16, the AMF 22, the SMF 24, the UPF 20, or the AF 34 described above.

While not being limited thereto, some example embodiments of the present disclosure are provided below.

Embodiment 1: A method of operation of a network node (RCF or SMF) comprising performing a procedure that enables coordinated selection of a UPF, PPF, and AS for a wireless device.

Embodiment 2: The method of embodiment 1 wherein the network node is a SMF.

Embodiment 3: The method of embodiment 2 wherein performing the procedure that enables coordinated selection of a UPF, PPF, and AS for the wireless device comprises: receiving, from another network node, a message comprising a list of candidate PPF pools for a protocol data unit session for the wireless device; selecting a list of candidate UPF pools for the protocol data unit session for the wireless device; providing, to an AF, information comprising: (a) the list of candidate PPF pools and the list of candidate UPF pools or (b) combined information obtained by combining the list of candidate PPF pools and the list of candidate UPF pools; receiving, from the AF, AS related information comprising: (a) information that indicates an AS selected for the wireless device and/or (b) information that indicates at least one UPF pool from the list of candidate UPF pools and/or (c) information that indicates at least one PPF pool from the list of candidate PPF pools; selecting a UPF for the protocol data unit session for the wireless device based on the AS related information; and sending a message comprising an indication of the selected UPF to another network node.

Embodiment 4: The method of embodiment 3 wherein the indication of the selected UPF is an indication of a UPF pool of the selected UPF.

Embodiment 5: The method of embodiment 2 wherein performing the procedure that enables coordinated selection of a UPF, PPF, and AS for the wireless device comprises: obtaining, from an AF, a list of candidate AS locations; selecting a UPF for a protocol data unit session for the wireless device based on the list of candidate AS locations; and providing, to another network node, a message comprising an indication of the selected UPF to thereby enable coordinated selection of a PPF for the protocol data unit session for the wireless device.

Embodiment 6: The method of embodiment 2 wherein performing the procedure that enables coordinated selection of a UPF, PPF, and AS for the wireless device comprises: obtaining, from an AF, a list of candidate AS locations; providing, to another network node, a message comprising the list of candidate AS locations; receiving, from another network node, a message comprising an indication of a PPF selected for a protocol data unit session for the wireless device; and selecting a UPF for the protocol data unit session for the wireless device based on the PPF selected for the protocol data unit session for the wireless device.

Embodiment 7: The method of embodiment 2 wherein performing the procedure that enables coordinated selection of a UPF, PPF, and AS for the wireless device comprises: receiving, from another network node, a message comprising an indication of a PPF selected for a protocol data unit session for the wireless device; and selecting a UPF for the protocol data unit session for the wireless device based on the PPF selected for the protocol data unit session for the wireless device.

Embodiment 8: The method of embodiment 2 wherein performing the procedure that enables coordinated selection of a UPF, PPF, and AS for the wireless device comprises: obtaining, from another network node, a list of candidate AS locations; selecting a UPF for a protocol data unit session for the wireless device based on the list of candidate AS locations; and providing, to another network node, a message comprising an indication of the UPF selected for the protocol data unit session for the wireless device.

Embodiment 9: The method of embodiment 2 wherein performing the procedure that enables coordinated selection of a UPF, PPF, and AS for the wireless device comprises: selecting a UPF for a protocol data unit session for the wireless device based on one or more assumptions related to one or more AS locations; and providing, to another network node, a message comprising an indication of the selected UPF to thereby enable coordinated selection of a PPF for the protocol data unit session for the wireless device.

Embodiment 10: The method of embodiment 1 wherein the network node is a RCF.

Embodiment 11: The method of embodiment 2 wherein performing the procedure that enables coordinated selection of a UPF, PPF, and AS for the wireless device comprises: selecting a list of candidate PPF pools for a protocol data unit session for the wireless device; sending, to another network node, a message comprising the list of candidate PPF pools for the protocol data unit session for the wireless device; receiving, from another network node, a message comprising an indication of a UPF selected for the protocol data unit session for the wireless device; and selecting a PPF for the protocol data unit session for the wireless device based on the UPF selected for the protocol data unit session for the wireless device.

Embodiment 12: The method of embodiment 11 wherein the indication of the selected UPF is an indication of a UPF pool of the selected UPF.

Embodiment 13: The method of embodiment 12 wherein performing the procedure that enables coordinated selection of a UPF, PPF, and AS for the wireless device comprises: receiving, from another network node, a message comprising an indication of a UPF selected for a protocol data unit session for the wireless device; and selecting a PPF for the protocol data unit session for the wireless device based on the UPF selected for the protocol data unit session for the wireless device.

Embodiment 14: The method of embodiment 12 wherein performing the procedure that enables coordinated selection of a UPF, PPF, and AS for the wireless device comprises: obtaining, from another network node, a list of candidate AS locations; selecting a PPF for a protocol data unit session for the wireless device based on the list of candidate AS locations; and providing, to another network node, a message comprising an indication of the PPF selected for the protocol data unit session for the wireless device.

Embodiment 15: The method of embodiment 12 wherein performing the procedure that enables coordinated selection of a UPF, PPF, and AS for the wireless device comprises: obtaining, from an AF, a list of candidate AS locations; selecting a PPF for a protocol data unit session for the wireless device based on the list of candidate AS locations; and providing, to another network node, a message comprising an indication of the selected PPF to thereby enable coordinated selection of a UPF for the protocol data unit session for the wireless device.

Embodiment 16: The method of embodiment 12 wherein performing the procedure that enables coordinated selection of a UPF, PPF, and AS for the wireless device comprises: obtaining, from an AF, a list of candidate AS locations; providing, to another network node, a message comprising the list of candidate AS locations; receiving, from another network node, a message comprising an indication of a UPF selected for a protocol data unit session for the wireless device; and selecting a PPF for the protocol data unit session for the wireless device based on the UPF selected for the protocol data unit session for the wireless device.

Embodiment 17: The method of embodiment 12 wherein performing the procedure that enables coordinated selection of a UPF, PPF, and AS for the wireless device comprises: selecting a PPF for a protocol data unit session for the wireless device based on one or more assumptions related to one or more AS locations; and providing, to another network node, a message comprising an indication of the selected PPF to thereby enable coordinated selection of a UPF for the protocol data unit session for the wireless device.

Embodiment 18: A network node adapted to perform the method of any one of embodiments 1 to 17.

Embodiment 19: A computer program comprising instructions which, when executed on at least one processor, cause the at least one processor to carry out the method according to any one of embodiments 1 to 17.

Embodiment 20: A carrier containing the computer program of embodiment 19, wherein the carrier is one of an electronic signal, an optical signal, a radio signal, or a computer readable storage medium.

Embodiment 21: A network node comprising: at least one processor; and memory comprising instructions executable by the at least one processor whereby the network node is operable to perform the method of any one of embodiments 1 to 17.

Embodiment 22: A network node comprising: one or more modules operable to perform the method of any one of embodiments 1 to 17.

The following acronyms are used throughout this disclosure.

3DPP Third Generation Partnership Project
5G Fifth Generation
5GC Fifth Generation Core Network
AF Application Function
AMF Access and Mobility Management Function
AS Application Server
ASIC Application Specific Integrated Circuit
AUSF Authentication Server Function
CAPEX Capital Expenditure
CDN Content Delivery Network
CN Core Network
CO Central Office
CP Control Plane
CPU Central Processing Unit
CU Central Unit
CU-CP Central Unit-Control Plane
CU-UP Central Unit-User Plane
DN Data Network
DNAI Data Network Access Identifier
DNN Data Network Name
DNS Domain Name System
DSP Digital Signal Processor
eNB Enhanced or Evolved Node B
FPGA Field Programmable Gate Array
gNB New Radio Base Station
ID Identifier
IP Internet Protocol
IXP Internet Exchange Point
LBO Local Break-Out
LTE Long Term Evolution
MME Mobility Management Entity
ms Millisecond
MTC Machine Type Communication
NDC National Data Center
NEF Network Exposure Function
NG Next Generation
NGC Next Generation Core (Network)
NG-RAN Next Generation Radio Access Network
NR New Radio
NSPS National Security and Public Safety
OPEX Operative Expenditure
PCF Policy Control Function
PDN Packet Data Network
PDU Protocol Data Unit
P-GW Packet Data Network Gateway
PPF Packet Processing Function
QoE Quality of Experience
QoS Quality of Service
RAN Radio Access Network
RAT Radio Access Technology
RCF Radio Control Function
RDC Regional Data Center
REST Representational State Transfer
RRC Radio Resource Control
SCEF Service Capability Exposure Function
S-GW Serving Gateway
SMF Session Management Function
TEID Tunnel Endpoint Identifier
UDM User Data Management/Unified Data Management
UE User Equipment
UP User Plane
UPF User Plane Function
VoD Video-on-Demand
VR Virtual Reality Those skilled in the art will recognize improvements and modifications to the embodiments of the present disclosure. All such improvements and modifications are considered within the scope of the concepts disclosed herein.

What is claimed is:

1. A method of operation of a session management function, SMF, in a core network in a cellular communications network that comprises a radio access network and the core network, the method comprising:
   receiving information regarding one or more candidate Packet Processing Functions, PPFs, in the radio access network;
   determining one or more candidate User Plane Functions, UPFs, based on the one or more candidate PPFs;
   sending, to an Application Function, AF, a message comprising information regarding the one or more candidate PPFs and the one or more candidate UPFs;
   receiving, from the AF, information related to Application Server, AS, selection, wherein the AS is selected by the AF based on the information regarding the one or more candidate PPFs and the one or more candidate UPFs; and
   selecting a user plane function for a protocol data unit session for a wireless device based on the information related to AS selection such that the protocol data unit session for the wireless device utilizes the selected user plane function,
   wherein the information related to AS selection comprises information that indicates at least one PPF pool comprising the one or more candidate PPFs related to the selected AS selected by the AF and information that identifies the selected AS.

2. The method of claim 1 wherein the information related to AS selection comprises information that indicates at least one UPF pool related to the selected AS, wherein each of the at least one UPF pool comprises one or more UPFs where the UPF is a user plane function in the core network.

3. The method of claim 1 wherein the information related to AS selection comprises a list of one or more candidate AS locations.

4. The method of claim 1 wherein the information related to AS selection comprises one or more assumptions regarding locations of one or more candidate ASs.

5. The method of claim 1 further comprising:
   receiving, from another network node, a message comprising a list of candidate PPF pools for the protocol data unit session for the wireless device, each candidate PPF pool in the list of candidate PPF pools comprising one or more PPFs wherein a PPF is a user plane function in the radio access network;
   selecting a list of candidate User Plane Function, UPF, pools for the protocol data unit session for the wireless device, each candidate UPF pool in the list of candidate UPF pools comprising one or more UPFs wherein a UPF is a user plane function in the core network;
   providing, to the AF, information comprising: (a) the list of candidate PPF pools and the list of candidate UPF pools or (b) combined information obtained by combining the list of candidate PPF pools and the list of candidate UPF pools; and
   receiving, from the AF, AS related information comprising: (a) information that indicates an AS selected for the wireless device and/or (b) information that indicates at least one UPF pool from the list of candidate UPF pools and/or (c) information that indicates at least one PPF pool from the list of candidate PPF pools;

wherein:
selecting the user plane function comprises selecting a UPF for the protocol data unit session for the wireless device based on the AS related information; and
the method further comprises sending a message comprising an indication of the selected UPF to another network node.

6. The method of claim 5 wherein the indication of the selected UPF comprises an indication of a UPF pool of the selected UPF and/or an indication of the selected UPF.

7. The method of claim 5 wherein the indication of the selected UPF comprises a transport address and tunneling endpoint identifier of the selected UPF.

8. The method of claim 1 further comprising:
obtaining, from the AF, a list of candidate AS locations;
wherein:
selecting the user plane function comprises selecting a User Plane Function, UPF, for the protocol data unit session for the wireless device based on the list of candidate AS locations, the UPF being a user plane function in the core network; and
the method further comprises providing, to another network node, a message comprising an indication of the selected UPF.

9. The method of claim 1 further comprising:
obtaining, from the AF, a list of candidate AS locations;
providing, to another network node, a message comprising the list of candidate AS locations; and
receiving, from another network node, a message comprising an indication of a PPF selected for the protocol data unit session for the wireless device, the PPF being a user plane function in the radio access network;
wherein selecting the user plane function comprises selecting a User Plane Function, UPF, for the protocol data unit session for the wireless device based on the PPF selected for the protocol data unit session for the wireless device, the UPF being a user plane function in the core network.

10. A physical network node that hosts a session management function, SMF, in a core network in a cellular communications network that comprises a radio access network and the core network, the SMF being a logical network node and the physical network node comprising:
at least one processor; and
memory comprising instructions executable by the at least one processor whereby the physical network node is operable to implement the SMF, the SMF being operable to:
receive information regarding one or more candidate Packet Processing Functions, PPFs, in the radio access network;
determine one or more candidate User Plane Functions, UPFs, based on the one or more candidate PPFs;
send, to an Application Function, AF, a message comprising information regarding the one or more candidate PPFs and the one or more candidate UPFs;
receive, from the AF, information related to Application Server, AS, selection, wherein the AS is selected by the AF based on the information regarding the one or more candidate PPFs and the one or more candidate UPFs; and
select a user plane function for a protocol data unit session for a wireless device based on the information related to AS selection such that the protocol data unit session for the wireless device utilizes the selected user plane function,
wherein the information related to AS selection comprises information that indicates at least one PPF pool comprising the one or more candidate PPFs related to the selected AS selected by the AF and information that identifies the selected AS.

11. A method of operation for assisting in coordinated selection of an Application Server, AS, and a user plane function in a cellular communications network for a protocol data unit session for a wireless device, comprising:
receiving, from a session management function, SMF, of the cellular communications network, a message comprising information regarding two or more candidate Packet Processing Functions, PPFs, and two or more candidate User Plane Functions, UPFs, for the protocol data unit session for the wireless device, wherein the two or more candidate UPFs are determined at the SMF based on the two or more candidate PPFs;
selecting the AS based on the received information regarding the two or more candidate PPFs and the two or more candidate UPFs; and
providing, to the SMF, information related to AS selection, wherein the information related to AS selection comprises information that indicates at least one PPF pool comprising the two or more candidate PPFs related to the selected AS and information that identifies the selected AS.

12. The method of claim 11 further comprising storing information that indicates the selected AS is selected for the wireless device.

13. The method of claim 11 wherein the information in the received message comprises a list of PPF Pool Identifiers for the two or more candidate PPFs.

14. The method of claim 11 wherein the information regarding the two or more candidate UPFs comprises a list of UPF Pool Identifiers for the two or more candidate UPFs.

15. The method of claim 11 wherein the information in the received message is a combination of a list of PPF Pool Identifiers for the two or more candidate PPFs and a list of UPF Pool Identifiers for the two or more candidate UPFs.

16. The method of claim 11 wherein the information regarding the selected AS comprises information that indicates at least one of the two or more candidate PPFs and/or at least one of the two or more candidate UPFs.

17. The method of claim 11 wherein the information regarding the selected AS comprises information that indicates at least one PPF Pool for at least one of the two or more candidate PPFs and/or at least one UPF Pool for at least one of the two or more candidate UPFs.

18. The method of claim 11 wherein the information regarding the selected AS comprises information that identifies the selected AS or a location of the selected AS.

19. The method of claim 11, wherein, as an alternative to the information in the received message regarding the two or more candidate PPFs and the two or more candidate UPFs for the protocol data unit session for the wireless device, the information in the received message comprises information regarding the two or more candidate PPFs and information regarding the two or more candidate UPFs for the protocol data unit session for the wireless device, where a PPF is a user plane function in the radio access network of the cellular communications network and a UPF is a user plane function in a core network of the cellular communications network.

20. A physical network node that hosts an Application Function, AF, for assisting in coordinated selection of an Application Server, AS, and a user plane function in a cellular communications network for a protocol data unit session for a wireless device, the AF being a logical network node and the physical network node comprising:
- at least one processor; and
- memory comprising instructions executable by the at least one processor whereby the physical network node is operable to implement the AF, the AF being operable to:
  - receive, from a session management function, SMF, of the cellular communications network, a message comprising information regarding two or more candidate Packet Processing Functions, PPFs, and two or more candidate User Plane Functions, UPFs, for the protocol data unit session for the wireless device, wherein the two or more candidate UPFs are determined at the SMF based on the two or more candidate PPFs;
  - select the AS based on the received information regarding the two or more candidate PPFs and the two or more candidate UPFs; and
  - provide, to the SMF, information related to AS selection, wherein the information related to AS selection comprises information that indicates at least one PPF pool comprising the two or more candidate PPFs related to the selected AS and information that identifies the selected AS.

21. The physical network node of claim 20, wherein, alternative to the information in the received message regarding the two or more candidate PPFs and the two or more candidate UPFs for the protocol data unit session for the wireless device, the information in the received message comprises information regarding the two or more candidate PPFs and information regarding the two or more candidate UPFs for the protocol data unit session for the wireless device, where a PPF is a user plane function in the radio access network of the cellular communications network and a UPF is a user plane function in a core network of the cellular communications network.

22. A method of operation of an Application Function, AF, for assisting in coordinated selection of an Application Server, AS, and a user plane function in a cellular communications network for a protocol data unit session for a wireless device, comprising:
- receiving, from a session management function, SMF, of the cellular communications network, a request for possible AS locations, the request comprises information regarding one or more candidate Packet Processing Functions, PPFs, and one or more candidate User Plane Functions, UPFs, wherein the one or more candidate UPFs are determined at the SMF based on the one or more candidate PPFs;
- determining a plurality of possible AS locations based on the information regarding the one or more candidate PPFs and the one or more candidate UPFs; and
- sending, to the SMF, information that indicates the plurality of possible AS locations, the information indicating at least one PPF pool comprising the one or more candidate PPFs related to each of the plurality of possible AS locations.

* * * * *